(12) United States Patent
Naoi

(10) Patent No.: US 8,746,782 B2
(45) Date of Patent: Jun. 10, 2014

(54) CAR BODY FOREPART STRUCTURE

(75) Inventor: Daisuke Naoi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/876,593

(22) PCT Filed: Sep. 16, 2011

(86) PCT No.: PCT/JP2011/071184
§ 371 (c)(1),
(2), (4) Date: Mar. 28, 2013

(87) PCT Pub. No.: WO2012/043268
PCT Pub. Date: Apr. 5, 2012

(65) Prior Publication Data
US 2013/0181476 A1 Jul. 18, 2013

(30) Foreign Application Priority Data

Sep. 30, 2010 (JP) ................................. 2010-220958
Sep. 30, 2010 (JP) ................................. 2010-220959

(51) Int. Cl.
*B62D 35/02* (2006.01)
*B62D 25/24* (2006.01)

(52) U.S. Cl.
CPC ................ *B62D 35/02* (2013.01); *B62D 25/24* (2013.01)
USPC ................... 296/193.07; 296/180.1; 180/69.1; 280/847

(58) Field of Classification Search
CPC .... B60R 19/54; B62D 25/20; B62D 25/2018; B62D 25/2072; B62D 25/24; B62D 35/02; B62D 35/005
USPC ........... 296/180.1, 191, 193.01, 193.07, 199, 296/204; 280/159, 847, 848, 851; 180/69.1, 180/903
See application file for complete search history.

(56) References Cited

U.S. PATENT DOCUMENTS

2005/0067204 A1 * 3/2005 Rijsbergen et al. .......... 180/68.1

FOREIGN PATENT DOCUMENTS

| DE | 202009017309 U1 | 4/2010 |
| DE | 102008058993 A1 | 5/2010 |
| EP | 1972527 A1 | 9/2008 |
| FR | 2975659 A1 * | 11/2012 |
| JP | 2000-177652 | 6/2000 |
| JP | 2008030524 A * | 2/2008 |
| JP | 2010-137832 | 6/2010 |

OTHER PUBLICATIONS

European Search Report dated Jan. 23, 2014, 3 pages.

* cited by examiner

*Primary Examiner* — Glenn Dayoan
*Assistant Examiner* — Jason S Daniels
(74) *Attorney, Agent, or Firm* — Rankin, Hill & Clark LLP

(57) ABSTRACT

A maintenance cover includes a pair of lateral turning support parts provided at right and left sides of a front edge part, and a central turning support part. The lateral turning support parts have opening parts that can be caught by hook parts with an L-shaped cross-section that are provided at a cover main body part. The central turning support part has a stopper that is engageable with an inner wall surface of a side wall part provided at the cover main body part. When the maintenance cover is slid backwardly, a sliding operation of the maintenance cover is stopped by the lateral turning support parts and the central turning support part, and the maintenance cover is rotated with the lateral turning support parts being as supporting points.

11 Claims, 19 Drawing Sheets

FIG.8
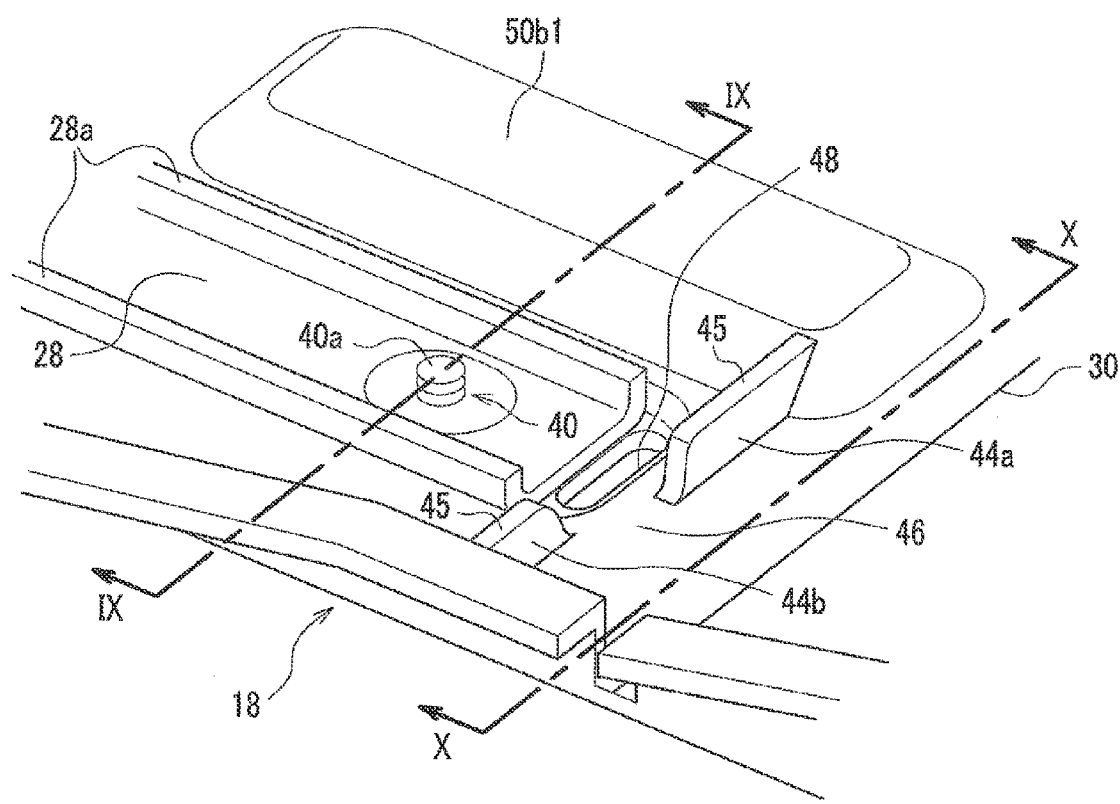
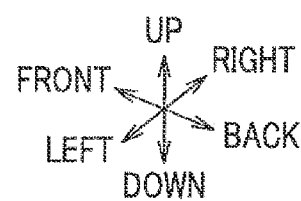

押圧力

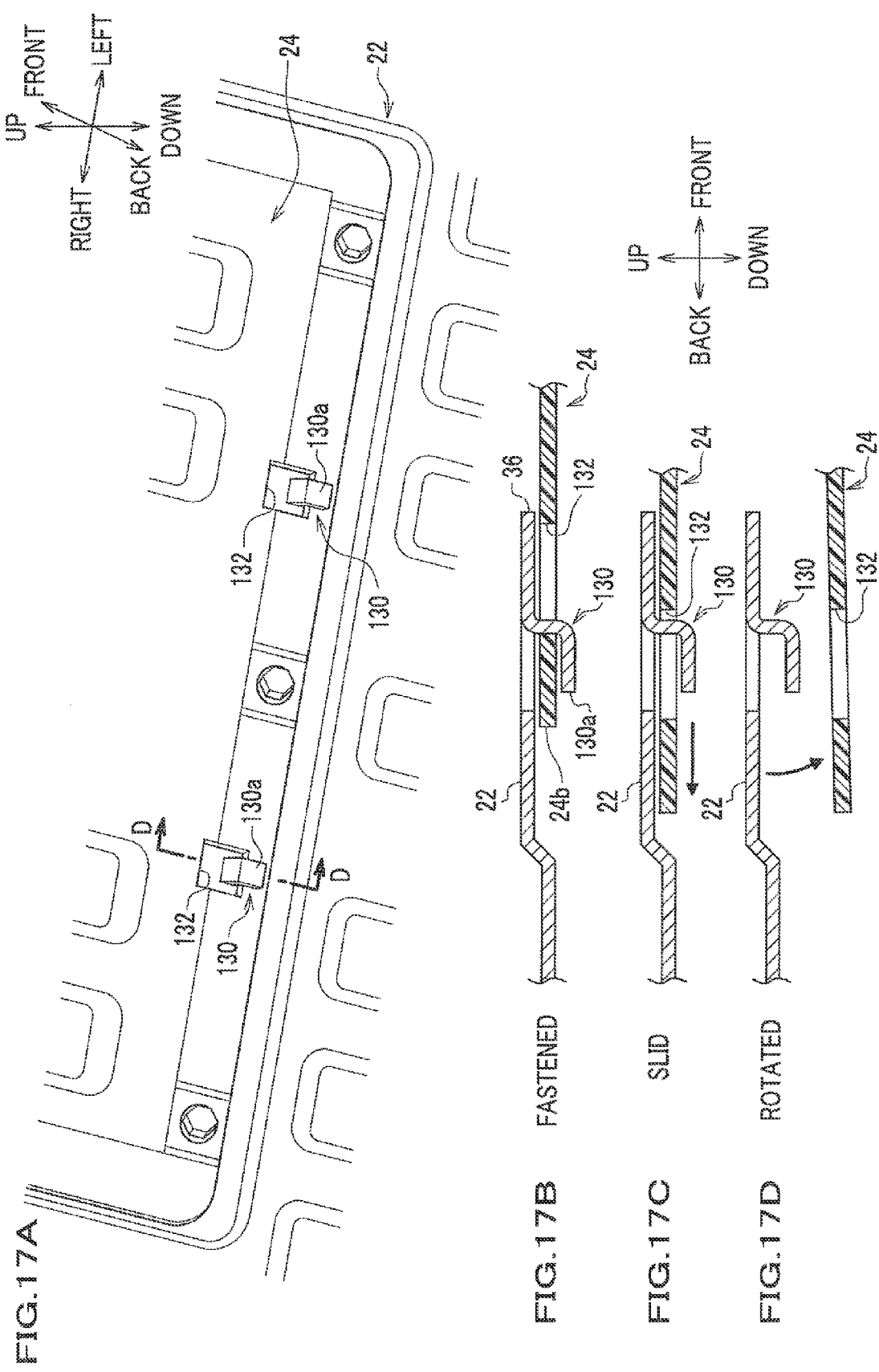

CAR BODY FOREPART STRUCTURE

TECHNICAL FIELD

The present invention relates to a car body forepart structure having an engine undercover provided at the bottom of a vehicle body front part.

BACKGROUND ART

Conventionally, it is known to provide an undercover which covers the bottom face of a vehicle body. The undercover is provided so as to protect an engine room, etc., from, for example, muddy water and stones splashed by tires and to improve aerodynamic characteristics by covering the unevenness of the bottom face of the vehicle.

With regard to this kind of undercover, for example, Patent Literature 1 discloses an inspection cover 2 that is provided in such a manner as to be slidably retained in an undercover 1 that covers the bottom face of an engine as shown in FIG. 21. Moreover, Patent Literature 2 proposes to provide deformation preventing means that retains the reinforcement beams in the retainer recess of the cover body to ensure the rigidity and strength of the plastic undercover, thereby preventing the beams from being plastically deformed.

PRIOR ART DOCUMENTS

Patent Literatures

Patent Literature 1: JP 2000-177652 A
Patent Literature 2: JP 2010-137832 A

DISCLOSURE OF INVENTION

Problem to be Solved by the Invention

However, the undercover 1 disclosed in Patent Literature 1 needs a place at which the inspection cover 2, which has been slid in the direction of the arrow from the undercover 1 and removed, is placed, and makes the maintenance service troublesome. Moreover, the undercover 1 disclosed in Patent Literature 1 needs a stroke S to retract the inspection cover 2, and as shown in FIG. 21, there is a disadvantage that a work space is increased by the stroke S.

In the undercover disclosed in Patent Literature 2, the beams are provided so as to be extended in the opening part of the sub-frame, and an engine, a transmission, etc., are provided above the opening part of the sub-frame. In this case, for an oil change or an inspection at the time of maintenance, it is necessary to provide a maintenance cover which can be opened and closed relative to the undercover that covers the bottom face of the vehicle body. However, in the undercover disclosed in Patent Literature 2, when the maintenance cover which can be opened and closed relative to the undercover is provided, the beams may not be retained in the retainer recess of the cover main body part.

An object of the present invention is to provide a car body forepart structure that is capable of further improving the maintainability without increasing a work space.

Another object of the present invention is to provide a car body forepart structure that is capable of ensuring the predetermined rigidity and strength of the engine undercover even if a maintenance cover is provided on the plastic engine undercover.

Means for Solving the Problems

In order to achieve the above objects, according to the present invention, a car body forepart structure provided with an engine undercover for covering a bottom face of a vehicle body front part, the engine undercover including: a maintenance cover provided at a center of the engine undercover; the maintenance cover including: a pair of lateral turning support parts provided at right and left sides of a front edge part of the maintenance cover; and a central turning support part provided between the pair of lateral turning support parts and at a rear side of the pair of lateral turning support parts; wherein the lateral turning support part has an opening part which can catch hook parts with an L-shaped cross-section and is provided at the engine undercover, the central turning support part has a stopper which engages with a wall surface of a side wall provided at the engine undercover, the lateral turning support parts and the central turning support part stop a sliding operation of the maintenance cover when the maintenance cover is slid backwardly, and the maintenance cover is rotated about the pair of lateral turning support parts which serve as supporting points, is provided.

According to the present invention, when the maintenance cover is slid backwardly in order to remove the maintenance cover from the engine undercover, the lateral turning support parts and the central turning support part stop the sliding operation of the maintenance cover, and the maintenance cover is rotated about the pair of lateral turning support parts which serve as supporting points. Accordingly, at a time of sliding during which heavy load is applied by a worker, the number of supporting points can be increased in comparison with a case in which the maintenance cover is rotated and light load is applied by only gravitational force of the maintenance cover, and thus the maintenance cover can be made thin and light-weighted.

Hence, according to the present invention, in maintenance, after the light-weight maintenance cover is slid and rotated, the maintenance cover can be hung from the engine undercover. Accordingly, a maintenance work is enabled without removing the whole maintenance cover from the engine undercover. Moreover, according to the present invention, a space for retracting the maintenance cover becomes unnecessary unlike the prior art, thereby further improving the maintainability without increasing a work space.

Moreover, according to the present invention, a rear-edge latch is provided at the engine-undercover side. The rear-edge latch is provided so as to be caught within a rectangular shaped opening part which is formed on a rear-edge part of the maintenance cover. Accordingly, the front edge part of the maintenance cover is provided so as to have the side rotation supporting parts engaged with the respective hook parts with a substantially L-shaped cross-section and is mounted on the top face of the engine undercover. Additionally, the rear-edge part of the maintenance cover is engaged with the rear-edge latch at the engine-undercover side, and thus a fastening work of fastening the maintenance cover to the engine undercover is facilitated without falling the maintenance cover.

Furthermore, according to the present invention, the engine undercover includes a semi-bowl shaped protrusion part which is provided at a front edge part thereof so as to avoid an interference with a jack supporting part. A side wall part engaged with the stopper of the central turning support part is provided at the semi-bowl shaped protrusion part. Hence, the side wall part has a curved surface which enhances the strength, and the engaging strength for engaging the stopper can be enhanced.

Still further, according to the present invention, a stopper rib is provided at a periphery part of the opening part of the side wall, and thus the engaging strength can be further enhanced. Yet further, according to the present invention, the stopper of the central turning support part is engaged with the wall surface of the side wall until an initial stage of a rotation operation of the maintenance cover. Accordingly, although there may be a case in which force is continuously applied by a worker at the initial stage of the rotation operation of the maintenance cover, the stopper of the central turning support part pushes up the periphery of the opening part of the side wall so as to kick up such a periphery of the opening part. Hence, load applied to the lateral turning support part can be reduced.

According to the present invention, the engine undercover includes a front cover part provided between a front part of a sub-frame and a rear part thereof, and a rear cover part provided between the sub-frame and a floor frame, and the front cover part and the rear cover part are provided so as to be independently openable and closable through a folding line part formed at a boundary between the front cover part and the rear cover part. Accordingly, the maintainability can be improved without removing the whole engine undercover.

According to the present invention, even if the maintenance cover is provided at the front center of the plastic-made engine undercover, the metallic reinforcing member which extends along the back-and-forth direction of the vehicle body is disposed at the right and left side parts adjacent to the maintenance cover and along the vehicle width direction. As a result, according to the present invention, the desired rigidity and strength of the engine undercover are ensured by the metallic reinforcing member, and thus a downward deformation of the engine undercover by the negative pressure at the time of a high speed running can be prevented, thereby remarkably contributing to the aerodynamic performance.

According to the present invention, the engine undercover includes a rib provided in a standing manner at the interference region with the metallic sub-frame disposed above the reinforcing member. Hence, the rib functions as an obstacle between the metallic reinforcing member and the metallic sub-frame, thereby appropriately avoiding a contact (interference) of metallic members with each other.

According to the present invention, the engine undercover includes a bead that extends along the back-and-forth direction of the vehicle body, and the rib is provided in a standing manner and continuously with the bead. Accordingly, the rigidity and strength of the engine undercover can be further enhanced.

According to the present invention, the engine undercover includes a rib formed by lifting up a side-edge part of the engine undercover, and a cut-out part provided between the rib formed continuously with the bead and the rib. Accordingly, a water drainage performance in the back-and-forth direction of the vehicle body can be improved.

According to the present invention, the drainage hole is formed on the engine undercover adjacent to the cut-out part, and thus a drainage to the exterior is facilitated.

Effect of the Invention

According to the present invention, a car body forepart structure which is capable of further improving the maintainability without increasing a work space can be obtained.

Moreover, according to the present invention, a car body forepart structure which can ensure the predetermined rigidity and strength of the engine undercover even if a maintenance cover is provided in the plastic engine undercover can be obtained.

BRIEF DESCRIPTION OF DRAWINGS

FIG. 8 is a partial enlarged perspective view of a metallic reinforcing member;

FIG. 17A is a partial enlarged perspective view of a rear-edge part of the maintenance cover as viewed from the bottom;

FIGS. 17B to 17D are operation explanatory diagrams of a rear-edge latch;

FIGS. 18A to 18C are vertical cross-sectional views for explaining a procedure of removing the maintenance cover, in which:

FIG. 18A illustrates a condition on which the maintenance cover is fastened;

FIG. 18B illustrates a condition on which the maintenance cover is slid; and

FIG. 18C illustrates a condition on which the maintenance cover is rotated;

BEST MODE FOR CARRYING OUT THE INVENTION

Figure 1:
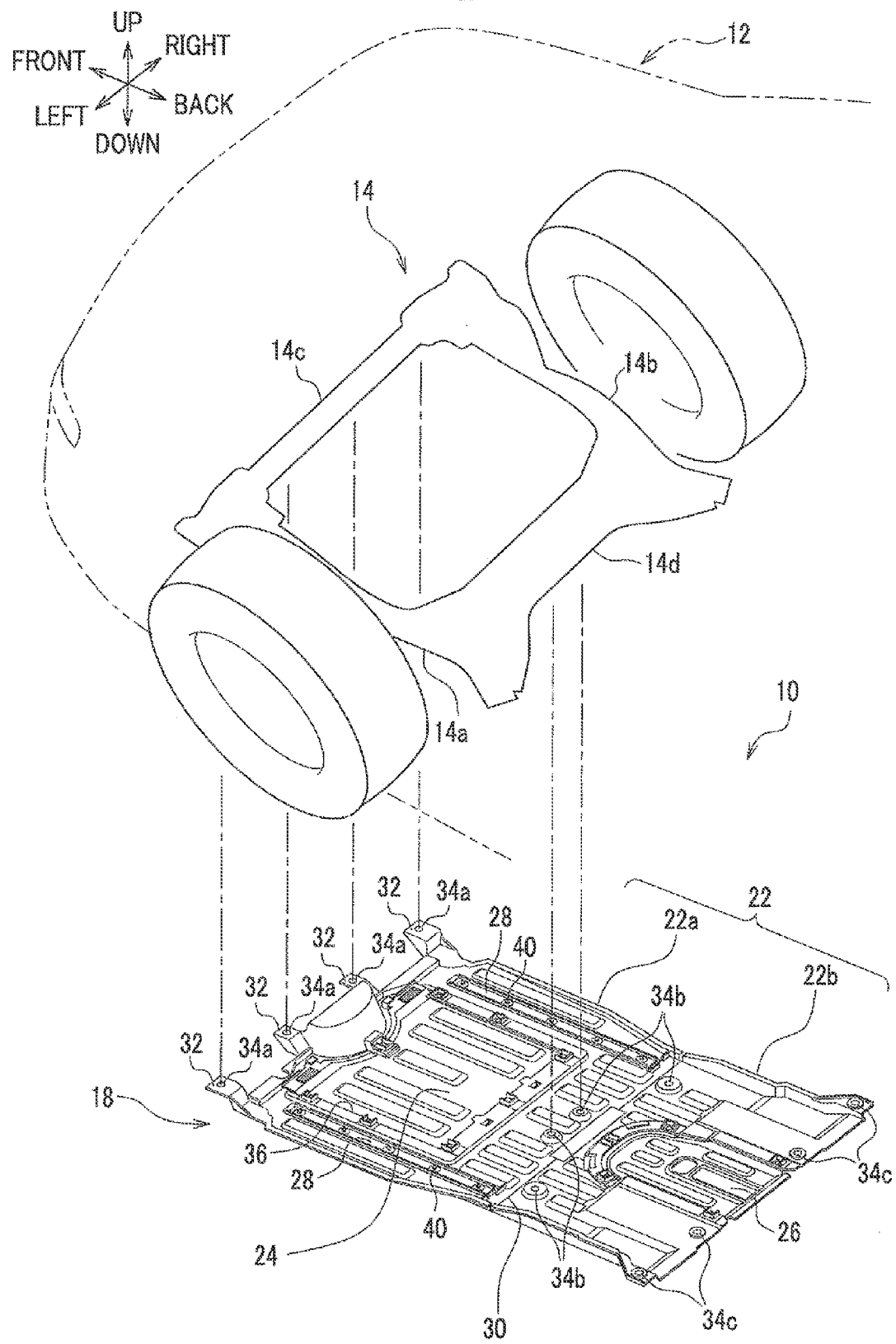
FIG. 1 is an exploded perspective view illustrating a car body forepart structure according to an embodiment of the present invention.
Figure 2:
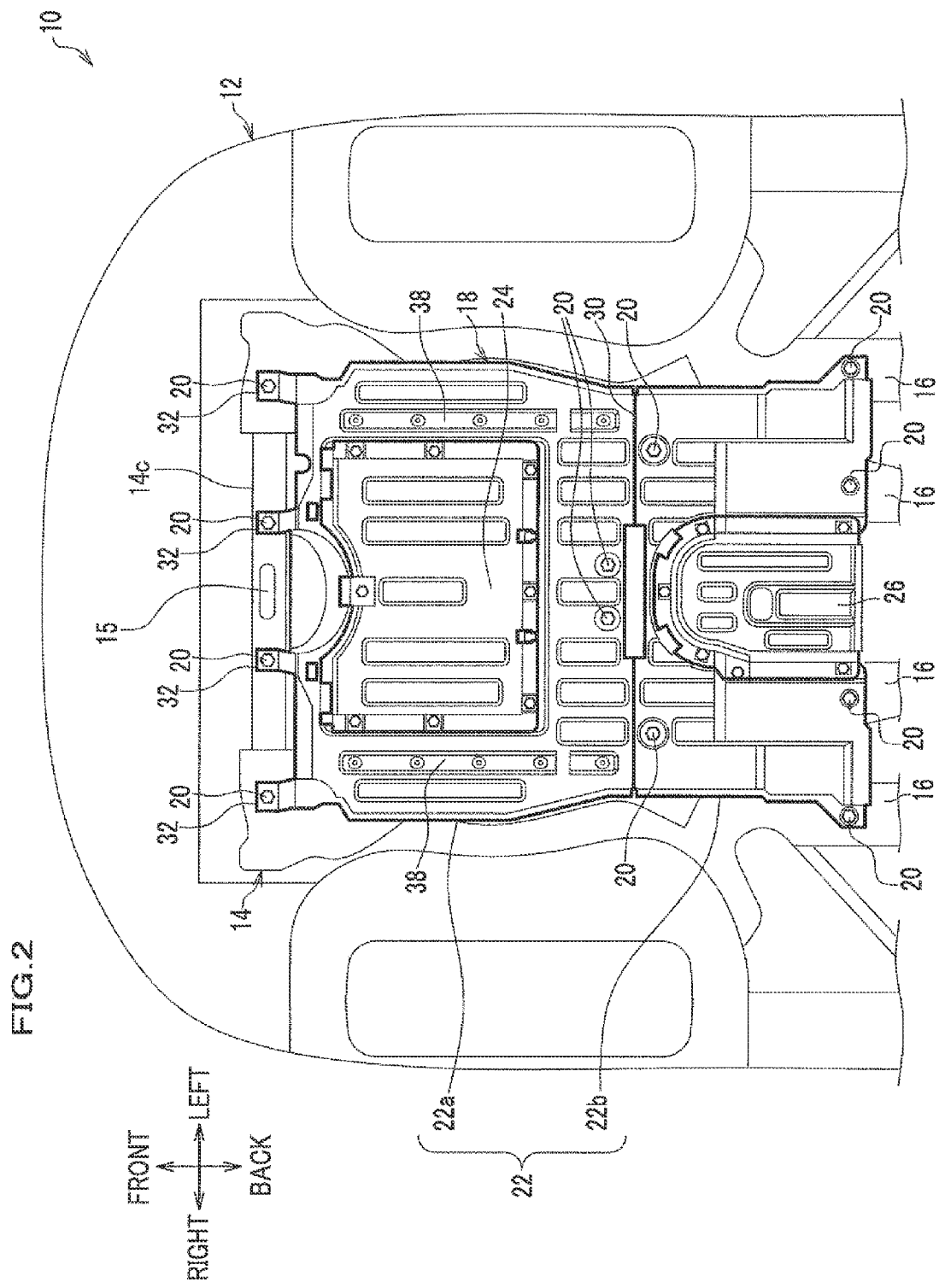
FIG. 2 is a bottom plain view of a vehicle body front part including an engine undercover constructing the car body forepart structure in FIG. 1 as viewed from the bottom.
Figure 3:
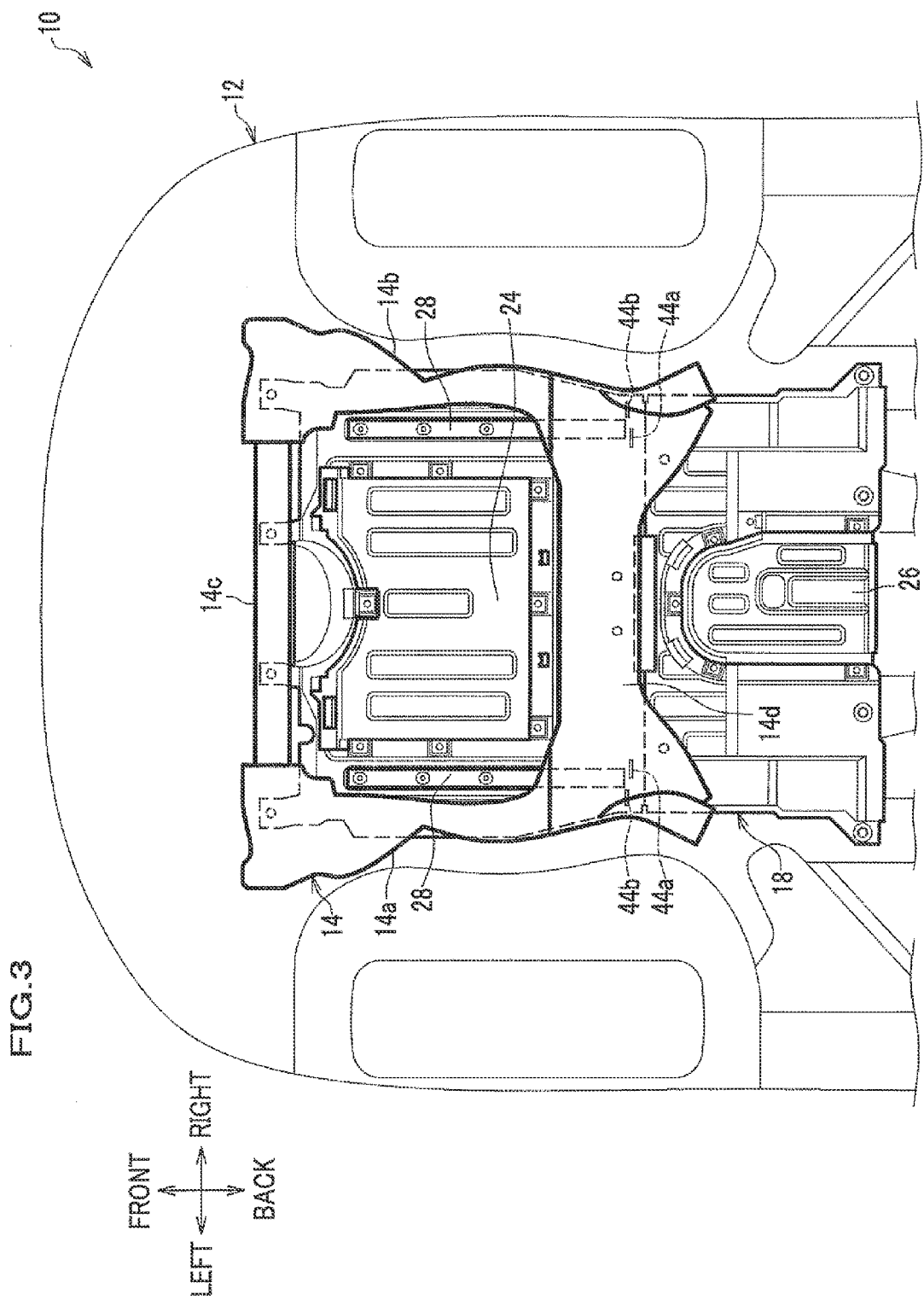
FIG. 3 is a plain view of the vehicle body front part including the engine undercover as viewed from the top.

Next, an embodiment of the present invention will be explained in detail with reference to the drawings as needed. FIG. 1 is an exploded perspective view illustrating a car body forepart structure according to an embodiment of the present invention. FIG. 2 is a bottom plain view of a vehicle body front part including an engine undercover constructing the car body forepart structure in FIG. 1 as viewed from the bottom. FIG. 3 is a plain view of the vehicle body front part including the engine undercover as viewed from the top.

In respective drawings, "upper" and "lower" indicate an upper side and a lower side along the vertical direction of the vehicle body, "front" and "rear" indicate a front side and a rear side along the back-and-forth direction of the vehicle body, and "left" and "right" indicate a left side and a right side along the width direction of the vehicle body.

As shown in FIG. 1 and FIG. 2, a car body forepart structure 10 is fixed on attaching parts of right and left front side frames (not shown) extending along the back-and-forth direction of the vehicle body 12, and includes a sub-frame 14 provided below a front part of the vehicle body 12, a floor frame 16 which is provided backwardly of the sub-frame 14, and which extends along the back-and-forth direction of the vehicle body, and an engine undercover 18 which is provided below the sub-frame 14 and the floor frame 16, and which mainly covers the bottom of an engine room where unillustrated engine, transmission, etc., are placed.

In the car body forepart structure 10 shown in FIG. 1, an illustration of a front bulkhead which is provided at a front end of the right and left front side frames (not shown) is omitted.

As shown in FIG. 3, the sub-frame 14 is a frame body in a substantially rectangular shape which is formed of a metallic material, and includes a left side member 14a extending along the back-and-forth direction of the vehicle body, a right side member 14b extending along the back-and-forth direction of the vehicle body, a columnar front cross member 14c bridged across respective front ends of the right and left side members 14a, 14b along a substantially horizontal direction, and a rear cross member 14d bridged across respective rear ends of the left and right side members 14a, 14b in the substantially horizontal direction. Provided in a substantially central part of the front cross member 14 is a jack supporting part 15 to jack up the vehicle body 12 with an unillustrated jack as shown in FIG. 2.

A plurality of thread parts are provided at the middle part of the front cross member 14c and the respective front ends of the right and left side members 14a, 14b, and the front end (a protrusion 32 to be discussed later) of the engine undercover 18 is fastened to the sub-frame 14 by a plurality of bolts 20 (in this embodiment, four bolts are exemplified) which are fastened to the thread parts (see FIG. 2). Moreover, a plurality of thread parts are provided in the rear cross member 14d, and the middle part of the engine undercover 18 is fastened to the sub-frame 14 by a plurality of bolts 20 (in this embodiment, four bolts are exemplified) which are fastened to the thread parts (see FIG. 2).

Provided at the rear side of the sub-frame 14 are a plurality of floor frames 16 formed of a metallic material and extending along the back-and-forth direction of the vehicle body (see FIG. 2). A plurality of thread parts are provided at the respective front ends of the plurality of floor frames 16, and the rear end of the engine undercover 18 is fastened to the floor frame 16 by a plurality of bolts 20 (in this embodiment, four bolts are exemplified) which are fastened to the thread parts (see FIG. 2). Fastening of the engine undercover 18 to the sub-frame 14 and the floor frame 16 will be explained later in detail.

Figure 4:
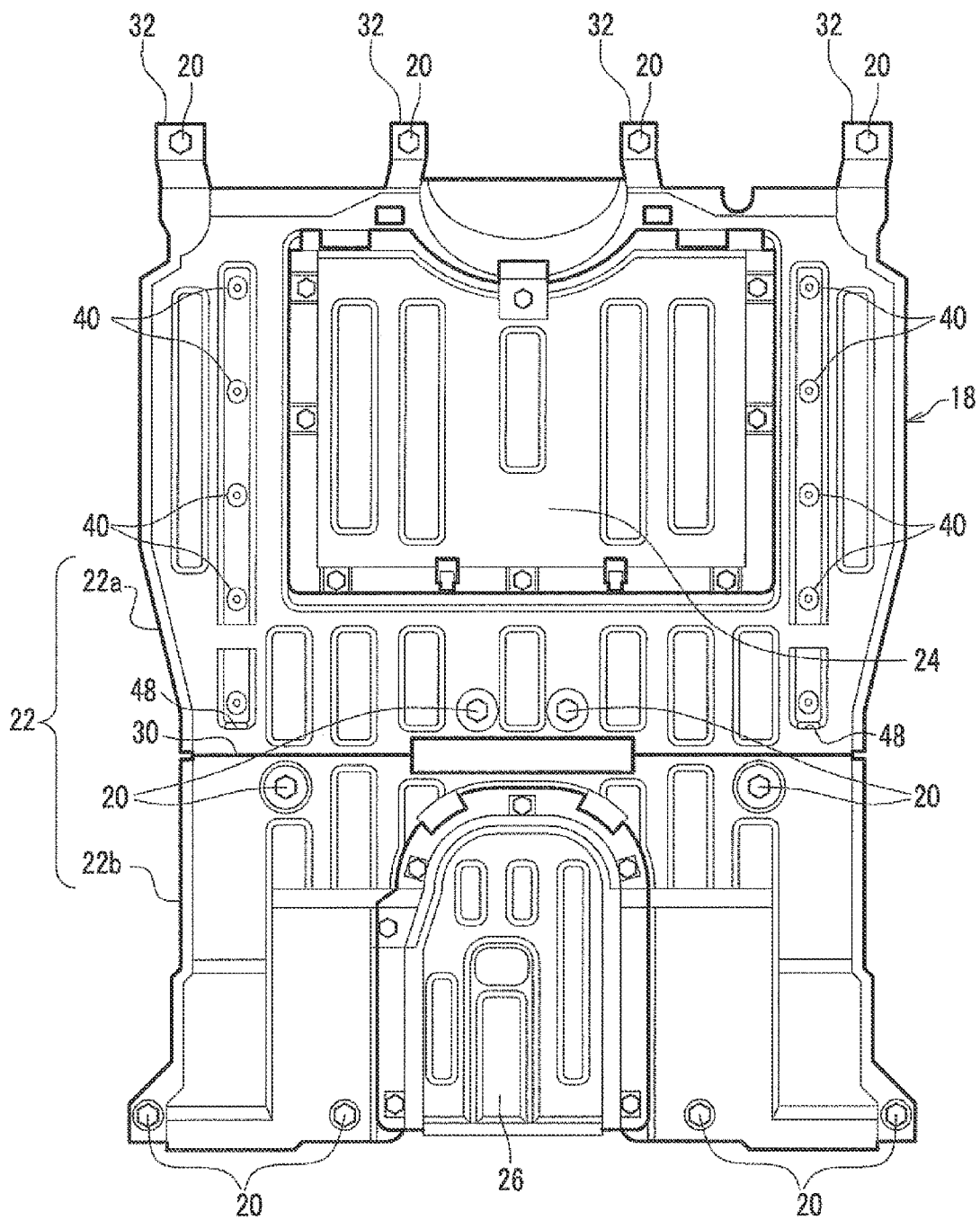
FIG. 4 is a bottom plain view of the engine undercover.
Figure 5:
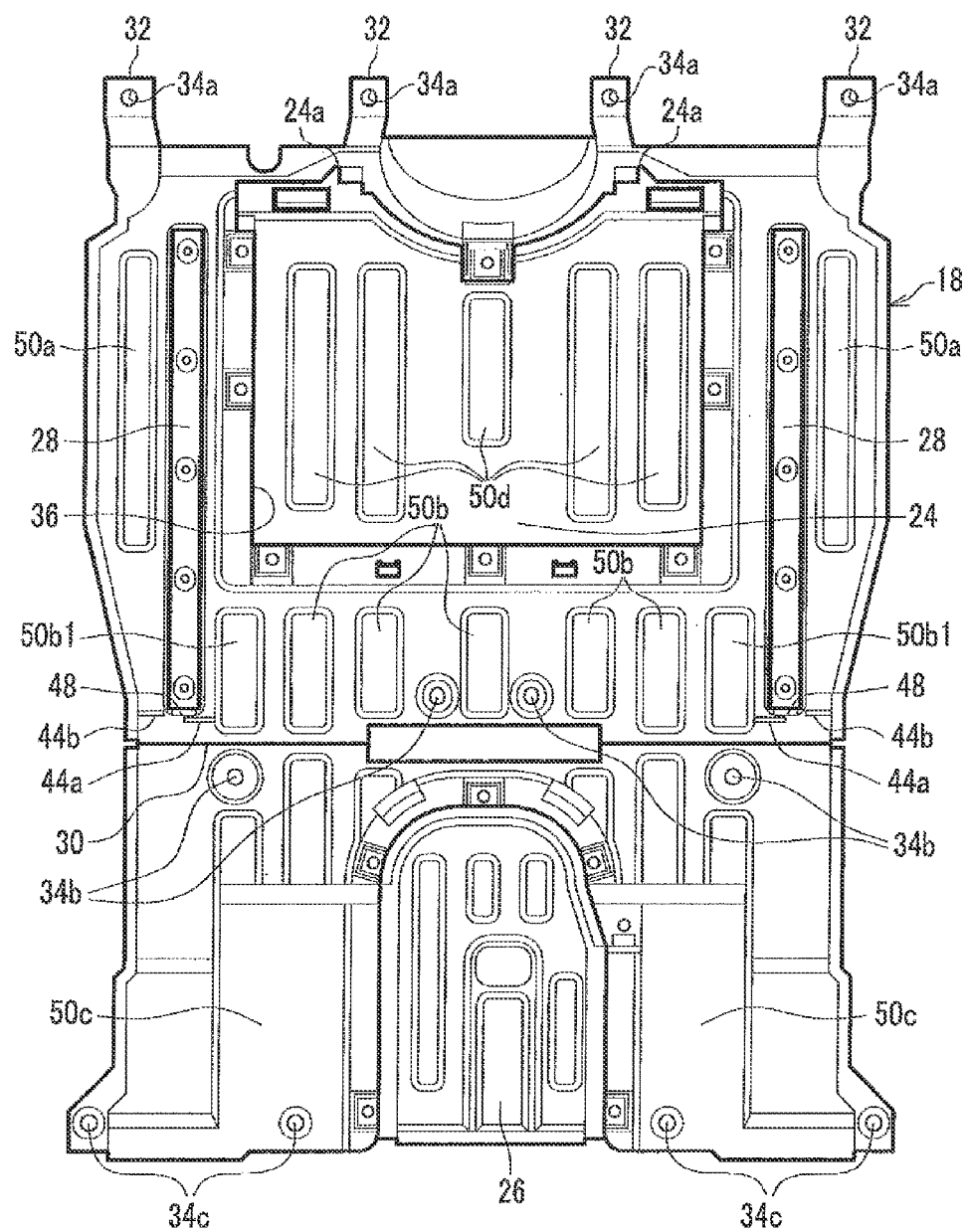
FIG. 5 is a plain view of the engine undercover.
Figure 6:
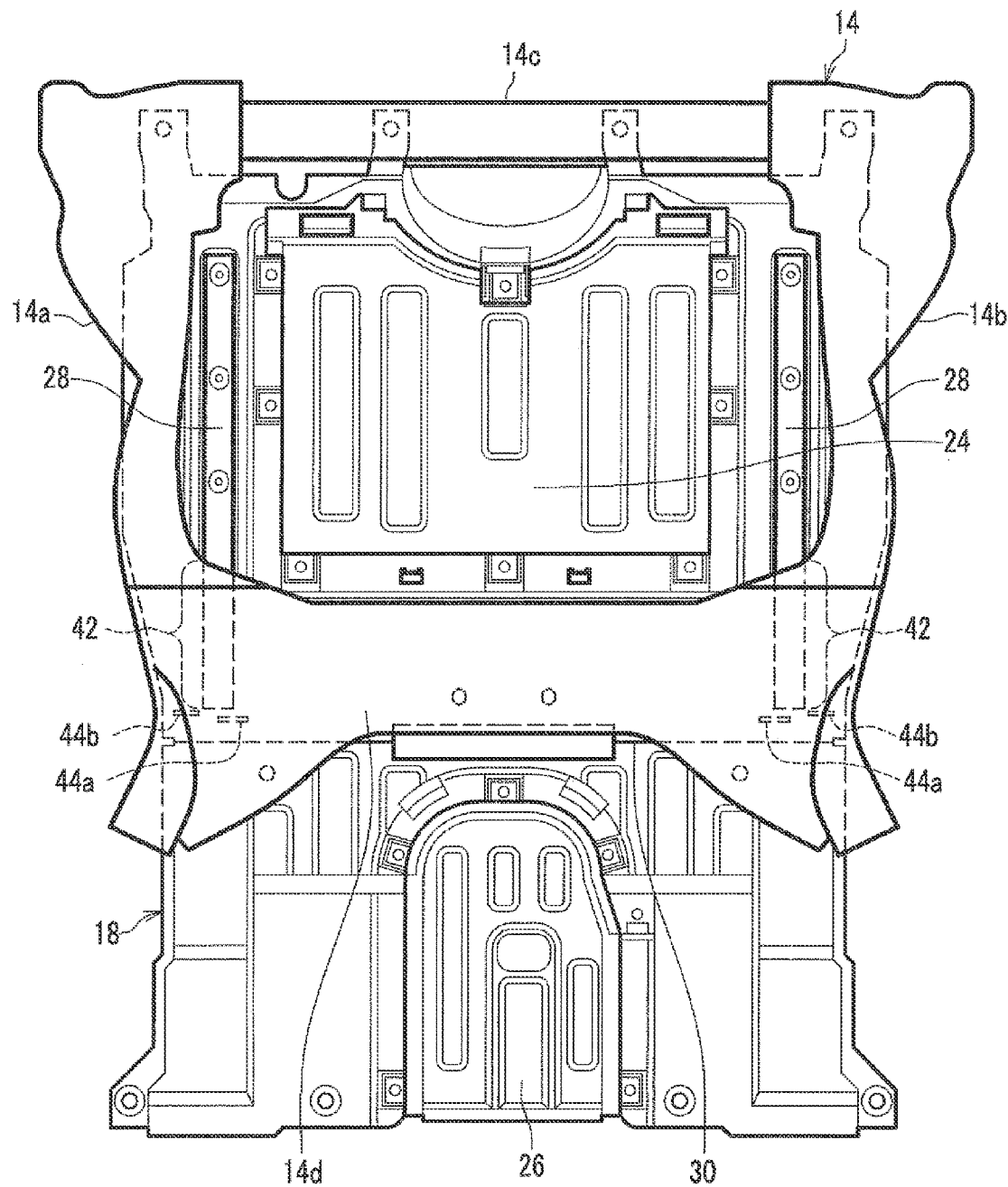
FIG. 6 is a plain view of the engine undercover in FIG. 5 with a sub-frame mounted thereon.
Figure 7:
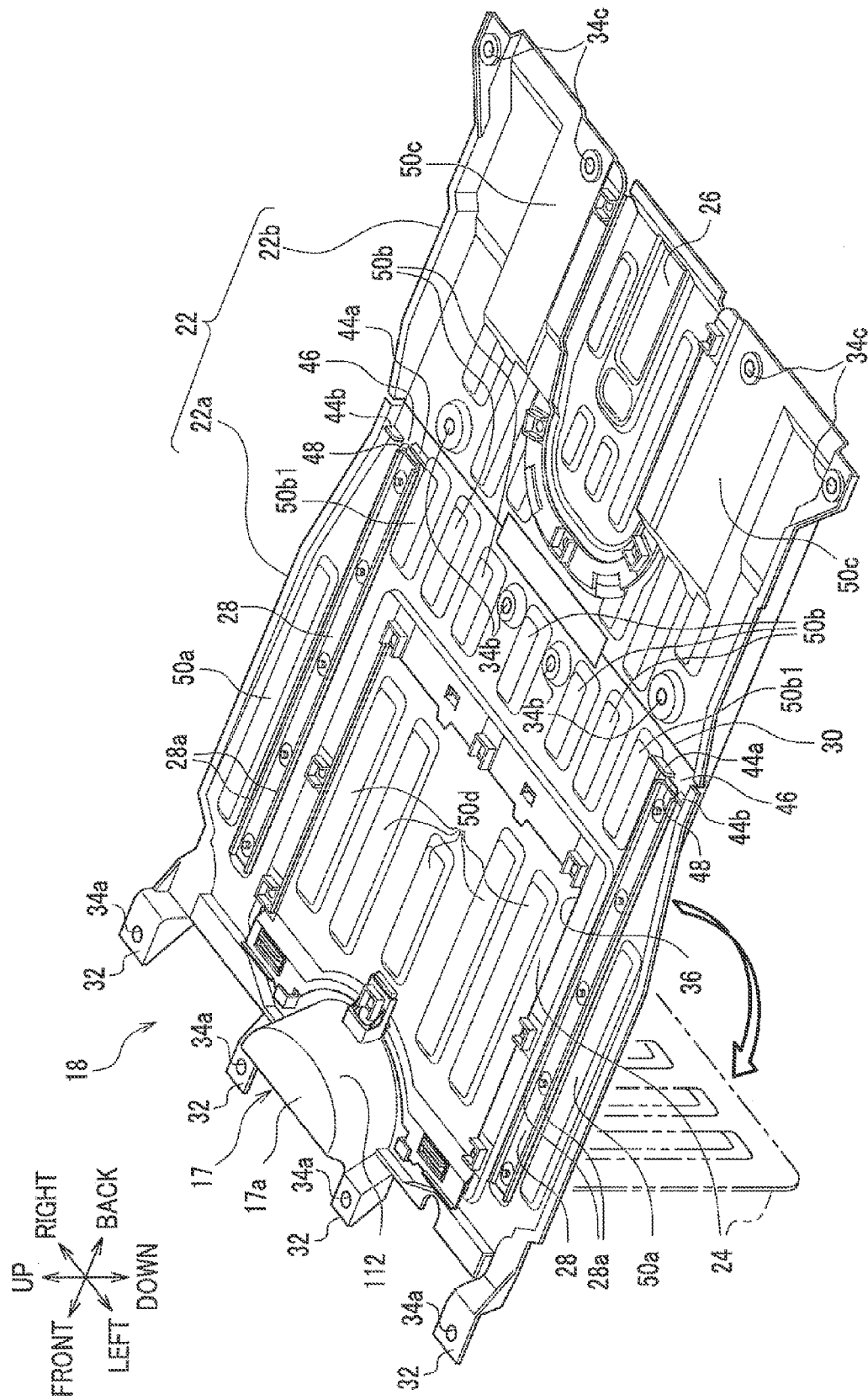
FIG. 7 is a perspective view of the engine undercover.

FIG. 4 is a bottom view of the engine undercover, and FIG. 5 is a plain view of the engine undercover. FIG. 6 is a plain view of the engine undercover in FIG. 5 with the sub-frame mounted thereon, and FIG. 7 is a perspective view of the engine undercover.

The engine undercover 18 is provided so as to cover the bottom of the engine room where the unillustrated engine and transmission are placed.

The engine undercover 18 includes a cover body 22 formed in a substantially rectangular shape in a planar view and of a plastic material, a maintenance cover 24 provided at, near the front of the engine undercover 18, a central part of the engine undercover 18 along the vehicle width direction and formed of a plastic material, a semielliptical metal plate 26 provided at, near the rear of the engine undercover 18, a central part thereof along the vehicle width direction, and a pair of metallic reinforcing members 28 disposed at right and left side parts along the vehicle width direction near the maintenance cover 24, and extending along the back-and-forth direction of the vehicle body.

The cover main body part 22 includes a front cover part 22a located between the front part of the sub-frame 14 and the rear part thereof, and a rear cover part 22b located between the rear part of the sub-frame 14 and the front end of the floor frame 16. Provided at the boundary part between the front cover part 22a and the rear cover part 22b is a folding line part 30.

Figure 19:
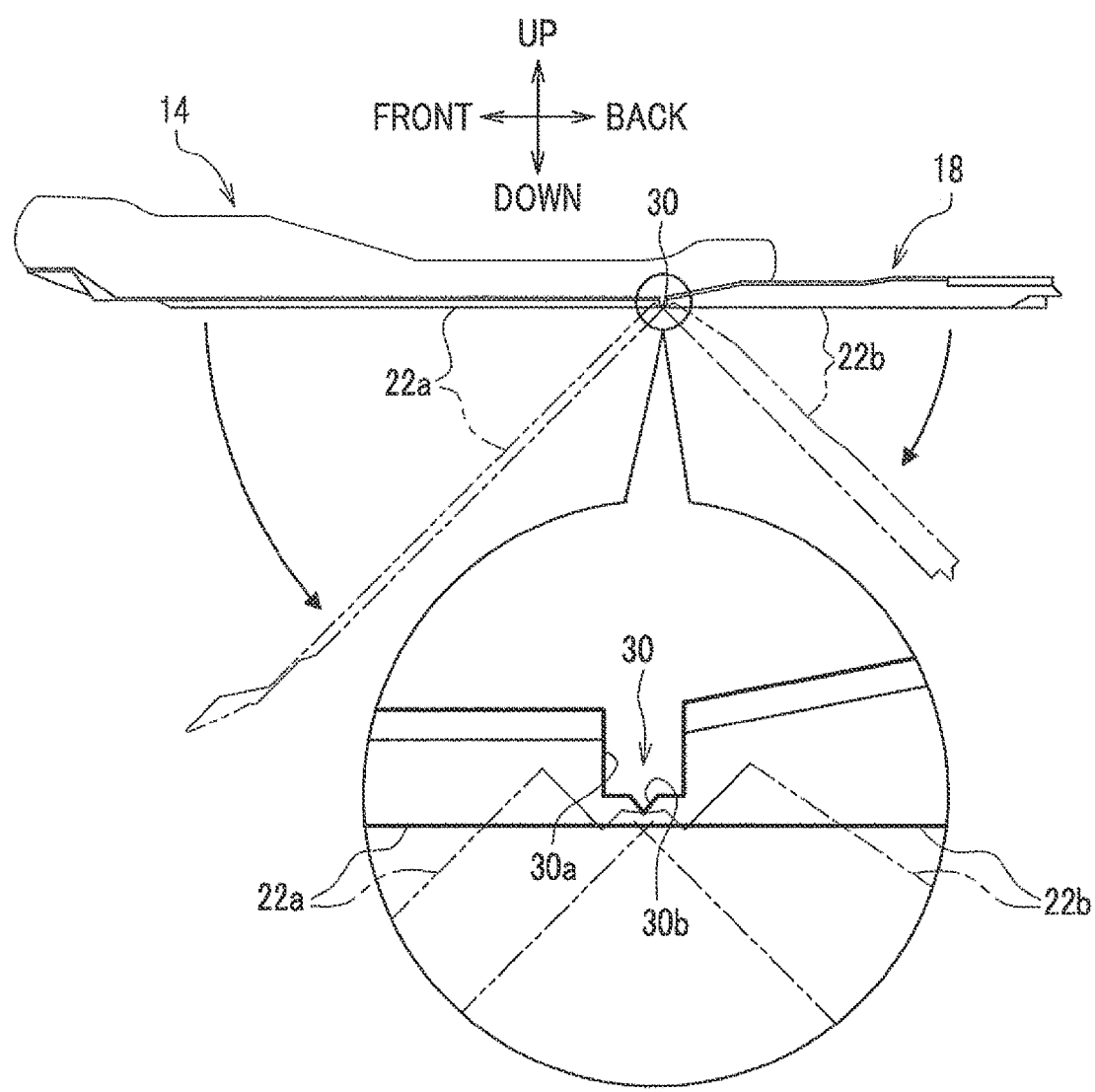
FIG. 19 is an explanatory diagram illustrating a condition on which a part of the engine undercover is removed during maintenance.

As shown in FIG. 19, the folding line part 30 has a recess 30a in a substantially rectangular cross-sectional shape and present between the front cover part 22a and the rear cover part 22b, and a groove 30b having a V-shaped cross-section is formed in the center of the recess 30a. The front cover part 22a and the rear cover part 22b are respectively provided so as to be foldable in an arc shape with the recess 30a and the groove part 30b being as supporting points. As a result, the front cover part 22a and the rear cover part 22b are provided so as to be independently openable and closable. As shown in FIG. 4 to FIG. 7, an elongated opening part is formed on the center of the folding line part 30.

Moreover, provided at a front end of the cover body 22 (a front end of the front cover part 22a) are four protrusions 32 that protrude toward the front by a predetermined length, and bolt insertion holes 34a (see FIG. 5 and FIG. 1) into which bolts 20 are inserted are formed through the respective protrusions 32 (in this embodiment, four bolt insertion holes 34a are exemplified). The bolts 20 that have inserted into the respective bolt insertion holes 34a from the bottom of the engine undercover 18 toward the top thereof are fastened with the unillustrated thread parts that are formed at the middle part of the front cross member 14c of the sub-frame 14 and at the respective front ends of the right and left side members 14a, 14b. Accordingly, the front end of the engine undercover 18 is fixed to the sub-frame 14.

Furthermore, a plurality of bolt insertion holes 34b (see FIG. 5 and FIG. 1) into which bolts 20 are inserted are formed through the middle part of the cover body 22 along the back-and-forth direction of the vehicle body (in the rear end of the front cover part 22a and the front end of the rear cover part 22b) (in this embodiment, four bolt insertion holes 34b are exemplified). The bolts 20 that have been inserted into the respective bolt insertion holes 34b from the bottom of the engine undercover 18 toward the top thereof are fastened with the unillustrated thread parts that are formed at the substantially central part of the rear cross member 14d of the sub-frame 14 and at the right and left sides thereof. Accordingly, the middle part of the engine undercover 18 is fixed to the sub-frame 14.

Still further, bolt insertion holes 34c (see FIG. 5 and FIG. 1) into which bolts 20 are inserted are formed through the rear end of the cover body 22 along the back-and-forth direction of the vehicle body (the rear end of the rear cover part 22b) (in this embodiment, four bolt insertion holes 34c are exemplified). The bolts 20 that have been inserted into the respective bolt holes 34c from the bottom of the engine undercover 18 toward the top thereof are fastened with the unillustrated thread parts that are formed at the front end of the floor frame 16 provided so as to extend substantially in parallel with the back-and-forth direction of the vehicle body. Accordingly, the rear end of the engine undercover 18 is fixed to the floor frame 16.

As a result, the front cover part 22a of the engine undercover 18 is fixed between the front part (front end) of the sub-frame 14 and the rear part (rear end) thereof, and the rear cover part 22b of the engine undercover 18 is fixed between the rear part (rear end) of the sub-frame 14 and the front end of the floor frame 16.

The maintenance cover 24 is formed of a plastic material, and is constructed by a cover body which is formed in a substantially rectangular tabular shape, and which closes an opening part 36 (see FIG. 1 and FIG. 5) formed in a substantially rectangular shape and formed through the cover main body part 22. After the maintenance cover 24 is slid to one side in the back-and-forth direction of the vehicle body, and the maintenance cover is rotated by a predetermined angle around a pair of supporting point parts 24a (see FIG. 5) which are caught at cover-main-body 22 side and are serving as rotation supporting points. Hence, an oil change, etc., of the unillustrated engine can be carried out through the opening part 36.

Figure 9:
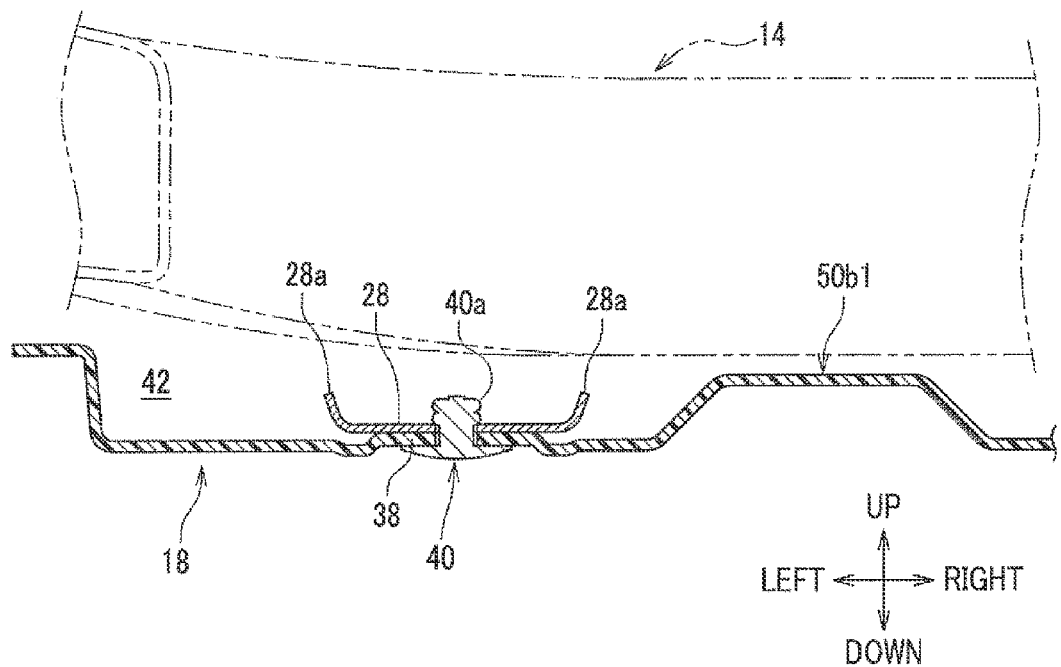
FIG. 9 is a vertical cross-sectional view taken along the line IX-IX of FIG. 8.
Figure 10:
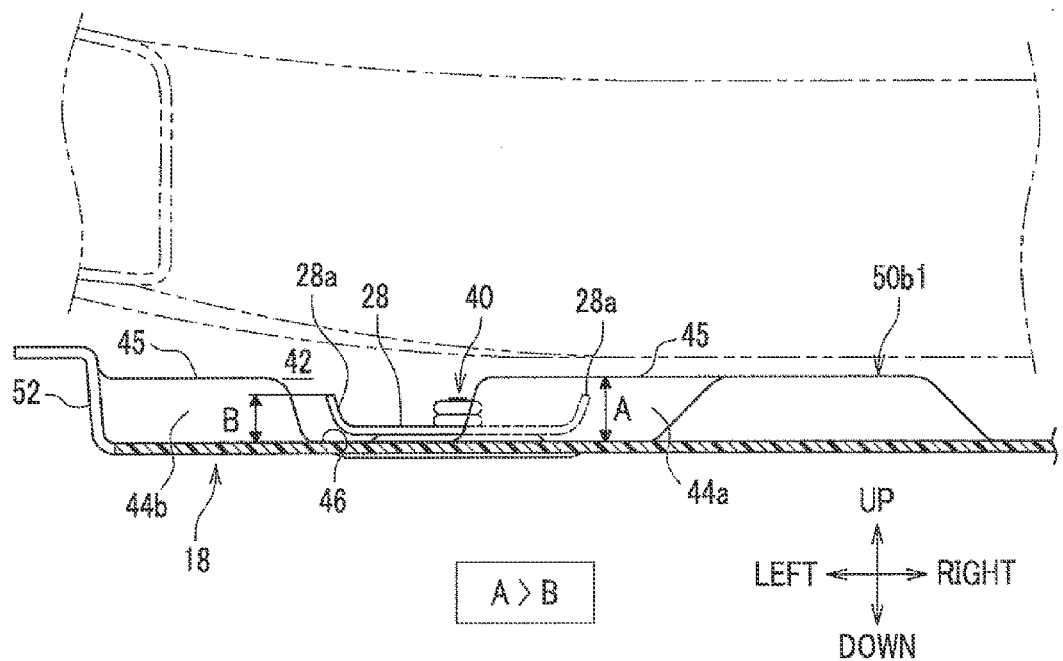
FIG. 10 is a vertical cross-sectional view taken along the line X-X of FIG. 8.

FIG. 8 is a partial enlarged perspective view of a metallic reinforcing member. FIG. 9 is a vertical cross-sectional view taken along the line IX-IX of FIG. 8. FIG. 10 is a vertical cross-sectional view taken along the line X-X of FIG. 8.

Provided at the right and left side parts along the vehicle width direction near the maintenance cover 24 are a pair of reinforcing members 28, 28 on the top face of the engine undercover 18 so as to extend along the back-and-forth direction of the vehicle body. The pair of reinforcing members 28, 28 respectively have the same shape. Hence, an explanation will be given of the reinforcing member 28 which is provided at the left side of the engine undercover 18 in detail, and an explanation of the reinforcing member 28 which is provided at the right side will be omitted.

As shown in FIG. 7, the reinforcing member 28 has a substantially U-shaped vertical cross-section having both edge parts 28a in the axial direction bent substantially upwardly, is formed of a metallic member which is elongated along the back-and-forth direction of the vehicle body. One end of the reinforcing member 28 along the axial direction extends in the vicinity of the front end of the front cover part 22a, and the other end of the reinforcing member 28 along the axial direction extends in the vicinity of the rear end (the folding line part 30) of the front cover part 22a.

Formed on the plastic-made engine undercover 18 is elongated protrusions 38 (see FIG. 2) that linearly extends along the back-and-forth direction of the vehicle body and protrude upwardly by a predetermined length. The reinforcing member 28 is fixed to the elongated protrusion 38 by rivets 40.

By forming the elongated protrusions 38 on the top face of the engine undercover 18, the metallic reinforcing members 28 contact only the respective elongated protrusions 38, facilitating the fastening by the rivets 40. Accordingly, the engine undercover 18 can be stably fastened to the reinforcing members 28 formed of a different material by the rivets 40. A shaft 40a (see FIG. 8) of the rivet 40 which is exposed to the exterior from the top face of the reinforcing member 28 is welded by unillustrated welding means, and thus the reinforcing member 28 can be easily fixed to the engine undercover 18.

As shown in FIG. 6, the metallic reinforcing member 28 which is fixed on the top face of the engine undercover 18 is provided so that a part of the reinforcing members overlaps the metallic sub-frame 14 which is provided above the engine undercover 18. Hence, an interference region 42 by both metallic members is present between the metallic reinforcing member 28 which is fixed on the top face of the engine undercover 18 and the metallic sub-frame 14 which is provided above the reinforcing member 28 (see FIG. 6).

First ribs 44a and second ribs 44b are provided in a standing manner in the engine undercover 18 near the respective other ends of the metallic reinforcing members 28 along the axial direction, and between the respective other ends and the folding line part 30. The first ribs 44a and the second ribs 44b are formed together with the engine undercover 18 by the same material, and disposed so as to be spaced apart from each other by the predetermined interval along the vehicle width direction. Moreover, the first ribs 44a and the second ribs 44b are formed so as to have respective upper ends 45 protruding toward the upper space, and the dimension A of the upper end 45 in a height direction is set to be higher than the height dimension B of the side-edge part 28a of the metallic reinforcing member 28 (dimension A>dimension B; see FIG. 10).

As a result, the first ribs 44a and/or the second ribs 44b function as obstacles between the metallic reinforcing member 28 and the metallic sub-frame 14, and thus a contact (interference) of both the metallic members is avoidable.

Provided between the first rib 44a and the second rib 44b which are spaced apart from each other by the predetermined interval along the vehicle width direction are a cut-out part 46 which is formed by cutting out a wall between the first rib 44a and the second rib 44b (see FIG. 7). By providing the cut-out part 46, for example, a water drainage performance in the back-and-forth direction of the vehicle body can be improved.

Moreover, in the engine undercover 18, formed between the other end of the reinforcing member 28 adjacent to the cut-out part 46 and the first rib 44a is a drainage hole 48 which is formed in a substantially ellipsoidal shape in planar views and is formed so as to pass all the way through both top and bottom faces (see FIG. 7). The drainage hole 48 is provided adjacent to the cut-out part 46, and thus a drainage to the exterior is facilitated through the drainage hole 48.

Moreover, provided side by side on the engine undercover 18 and the maintenance cover 24 are a plurality of beads 50a to 50d which are convexities protruding upwardly and having different lengths, and extend along the back-and-forth direction of the vehicle body (see FIG. 7). By providing the plurality of beads 50a to 50d, the desired rigidity of the plastic engine undercover 18 and the plastic maintenance cover 24 can be ensured.

That is, provided in the vicinity of the side ends of the front cover part 22a along the vehicle width direction are a pair of relatively long beads 50a which extend substantially in parallel to the axial line of the reinforcing member 28. In addition, provided in the vicinity of the rear end (the folding line part 30) of the front cover part 22a are a plurality of relatively long beads 50b which are provided substantially in parallel along the vehicle width direction.

Among the plurality of beads 50b, beads 50b1 which are closest to the right and the left side ends along the vehicle width direction of the engine undercover 18 are formed in continuous with the respective first ribs 44a (see FIG. 7). An interaction of the beads 50b1 which belong to the interference region 42 and the rib 44a further enhances the strength of the engine undercover 18. The second rib 44b is formed so as to have the side-edge part 52 (see FIG. 10) of the engine undercover 18 lifted upwardly.

Furthermore, provided on the rear cover part 22b are a pair of beads 50c having a widthwise dimension along the vehicle width direction formed relatively wide. Still further, in order to ensure the rigidity of the maintenance cover 24 formed of a plastic material, a plurality of beads 50d which extend along the back-and-forth direction of the vehicle body are provided.

Figure 11:
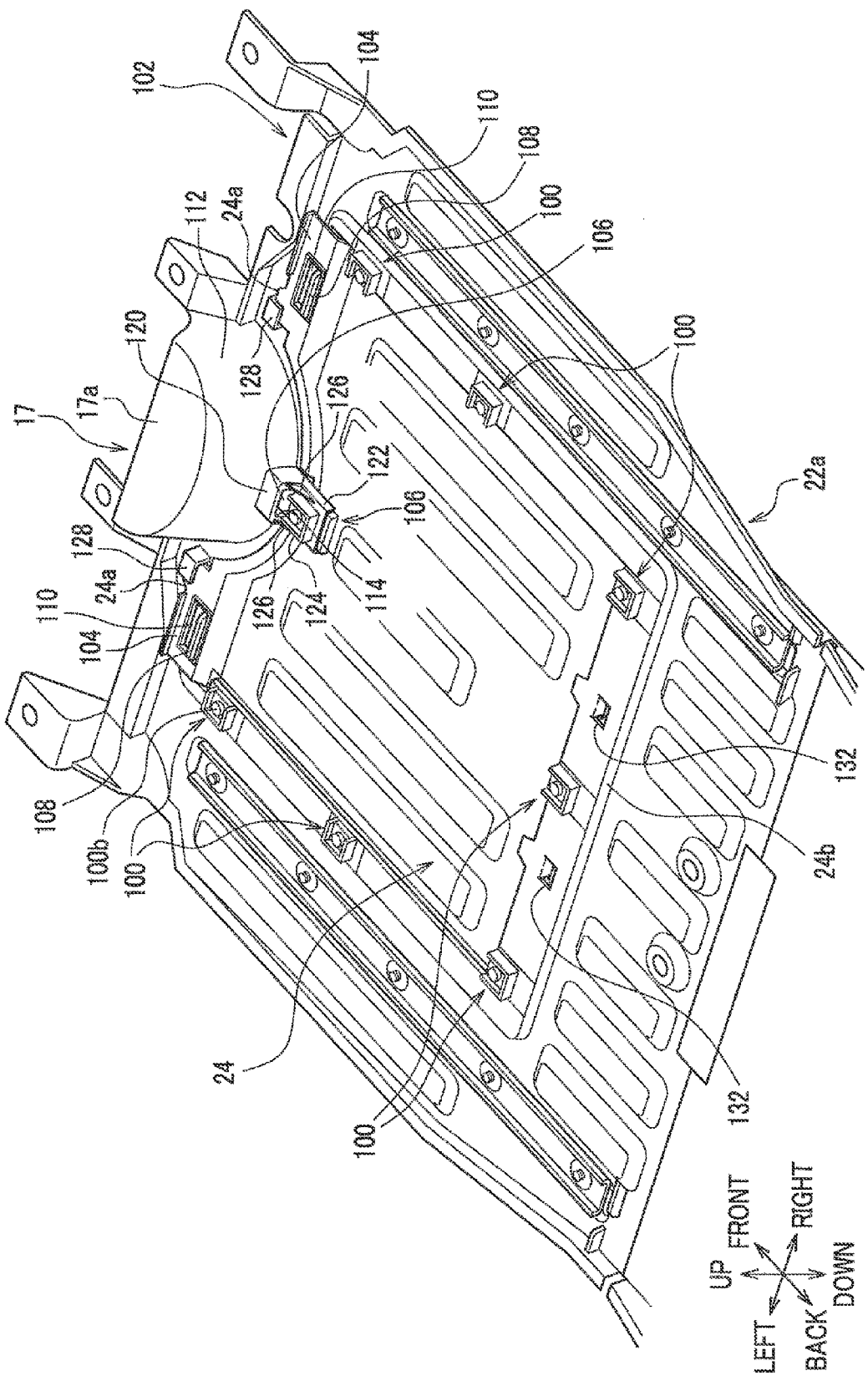
FIG. 11 is an enlarged perspective view of a part of the engine undercover including a maintenance cover as viewed from the top.
Figure 12:
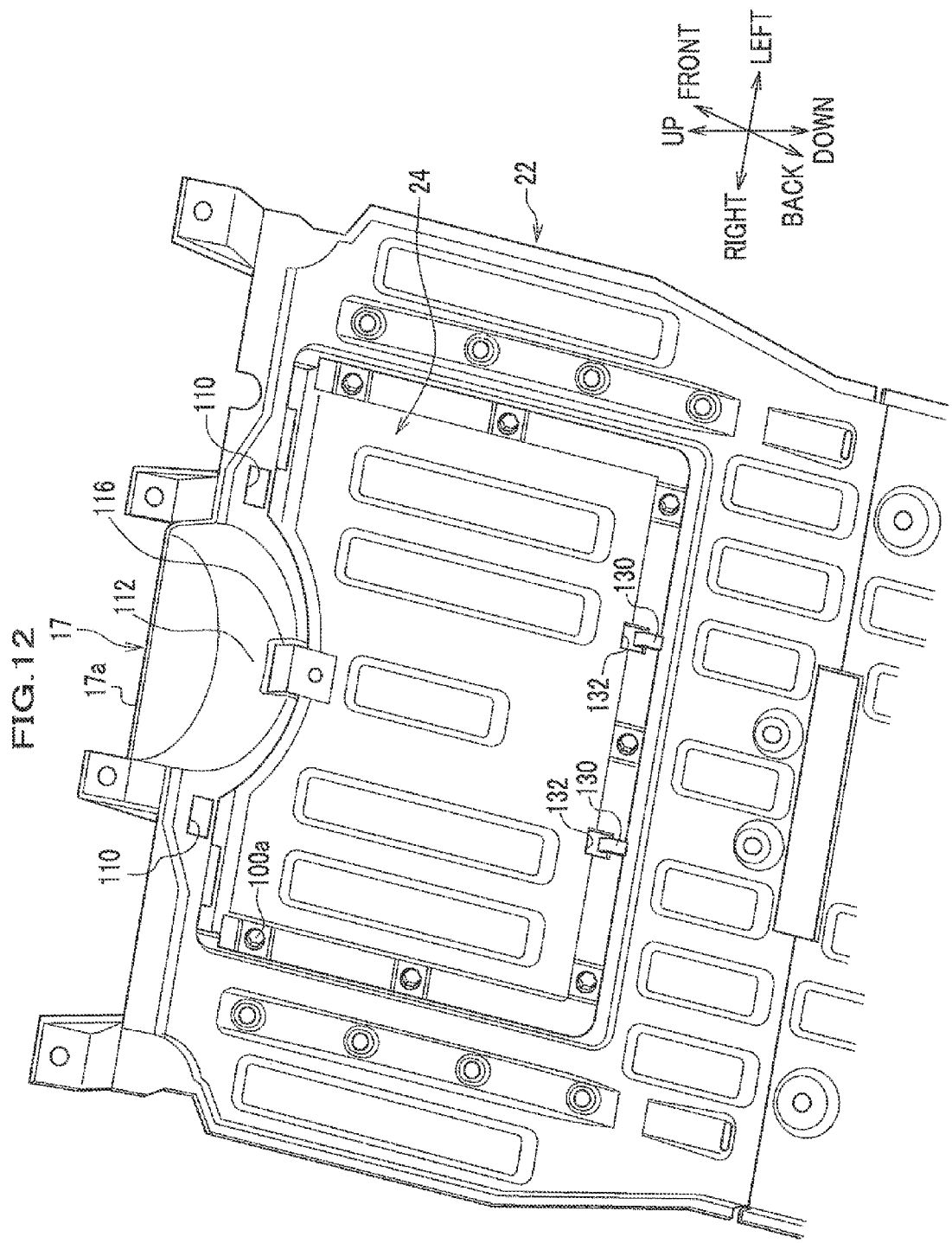
FIG. 12 is an enlarged perspective view of a part of the engine undercover including the maintenance cover as viewed from the bottom.
Figure 13:
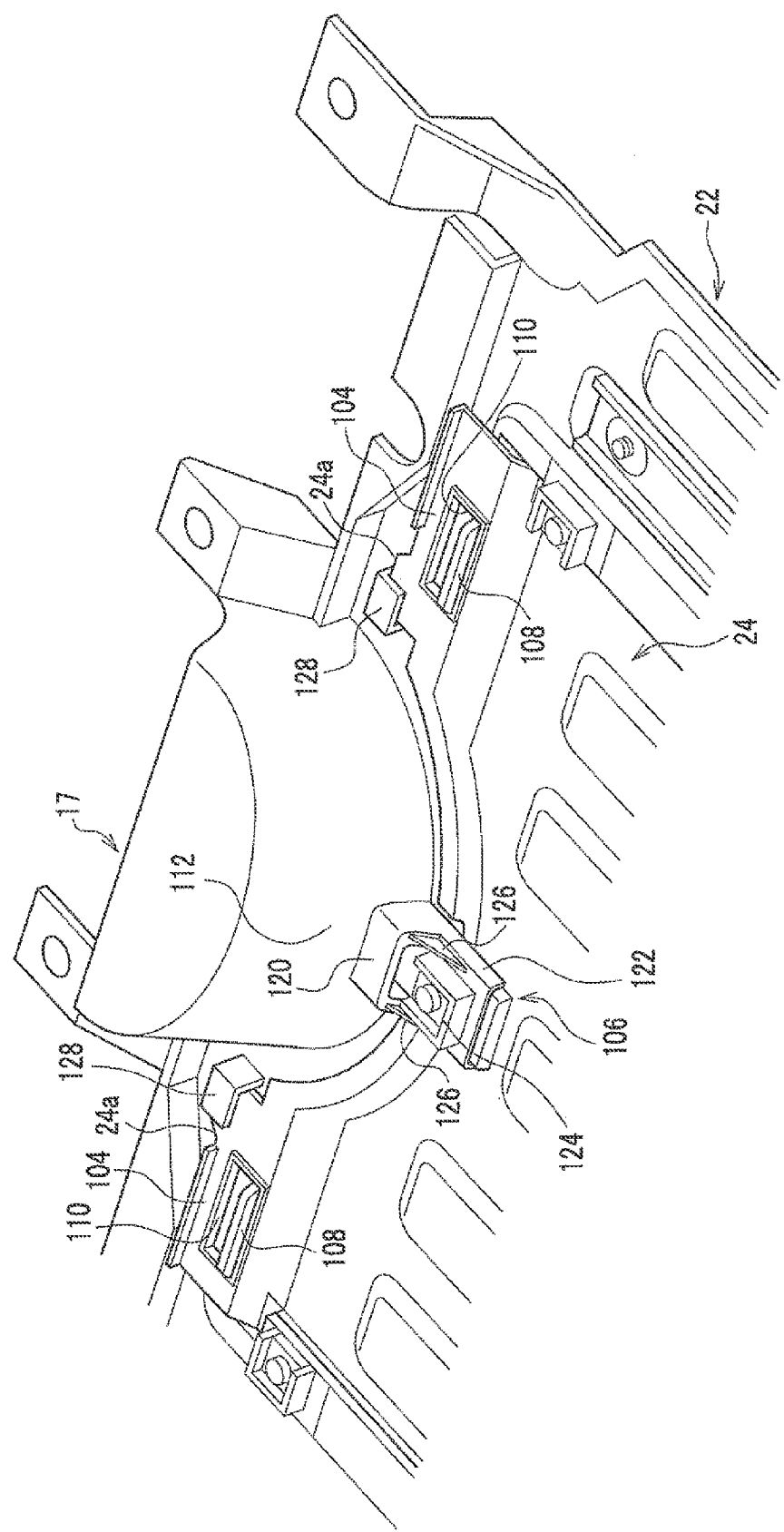
FIG. 13 is a partial enlarged perspective view illustrating a supporting mechanism of the maintenance cover.
Figure 14A:
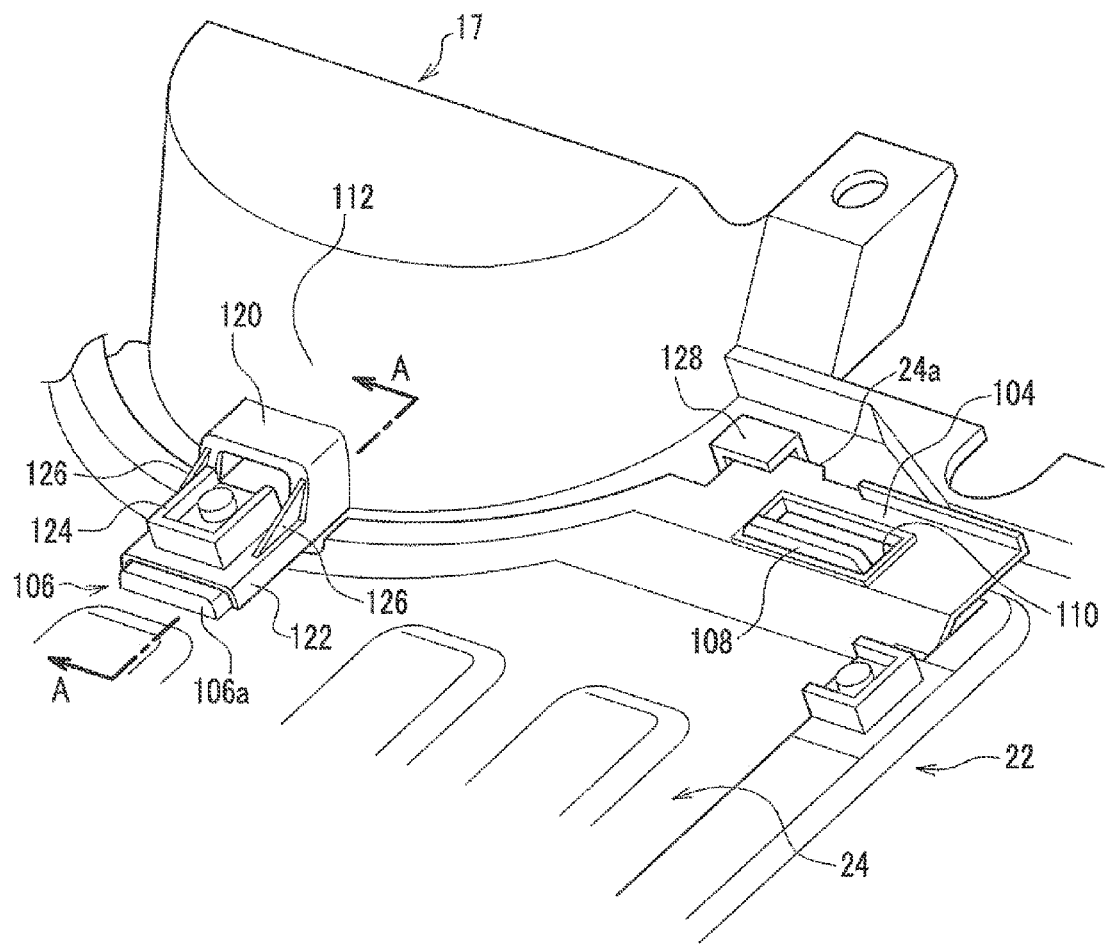
FIG. 14A is a partial enlarged perspective view for explaining a procedure of removing the maintenance cover.
Figure 14B:
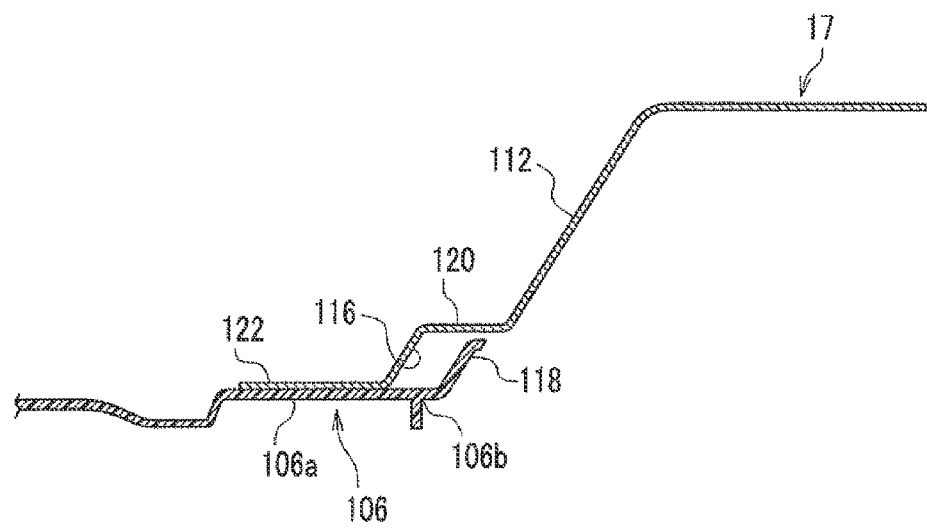
FIG. 14B is a vertical end view taken along the line A-A of FIG. 14A.
Figure 15A:
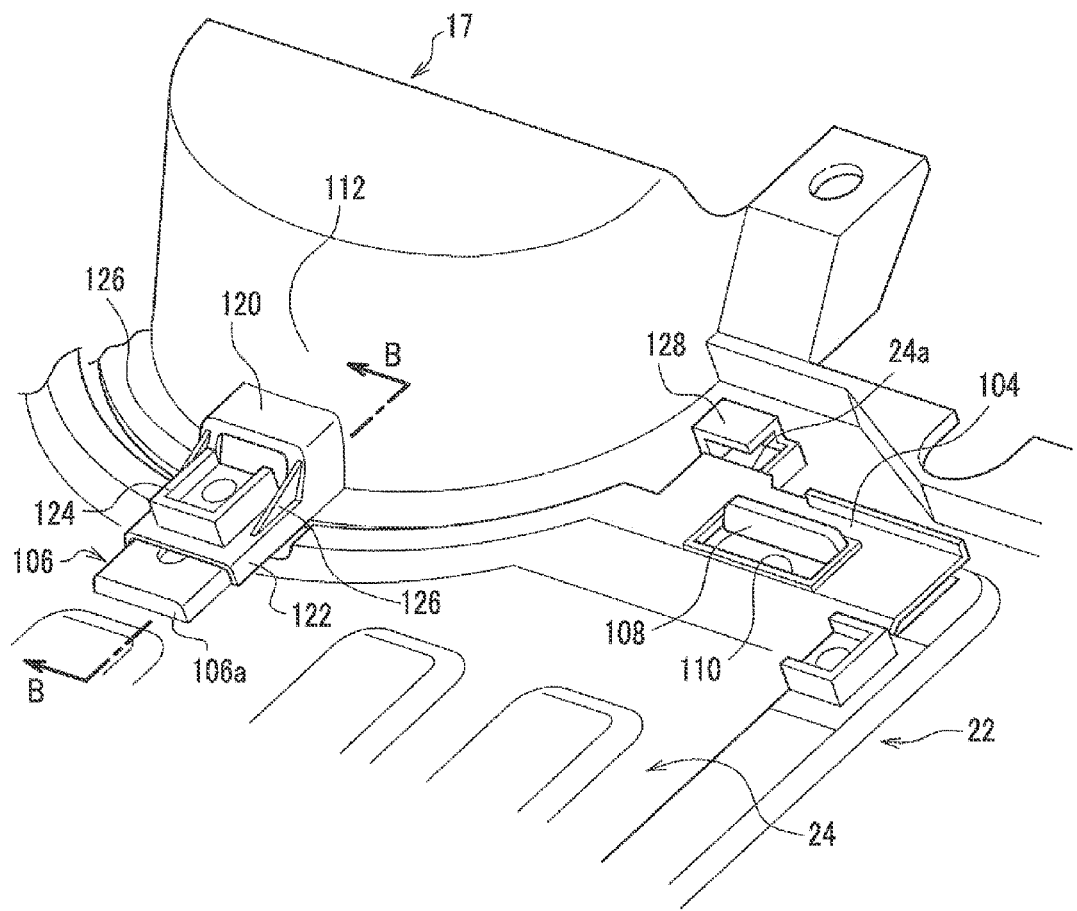
FIG. 15A is a partial enlarged perspective view for explaining a procedure of removing the maintenance cover.
Figure 15B:
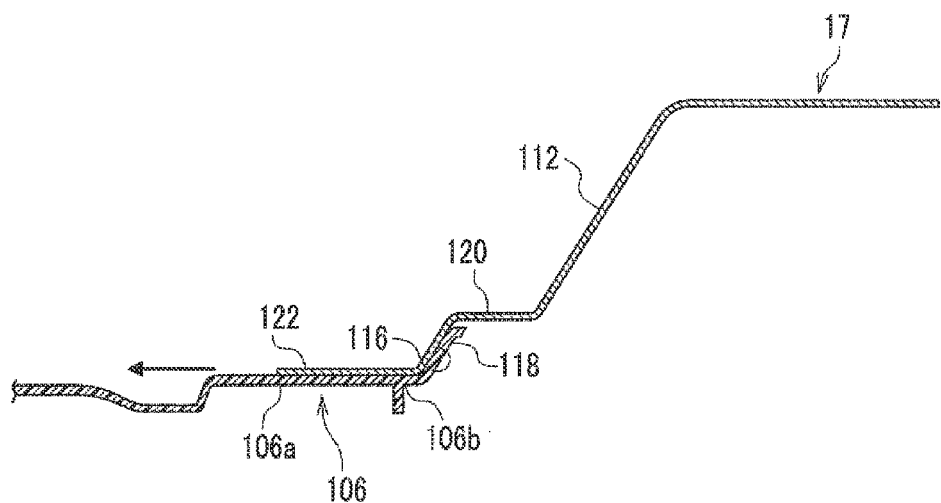
FIG. 15B is a vertical end view taken along the line B-B of FIG. 15A.
Figure 16A:
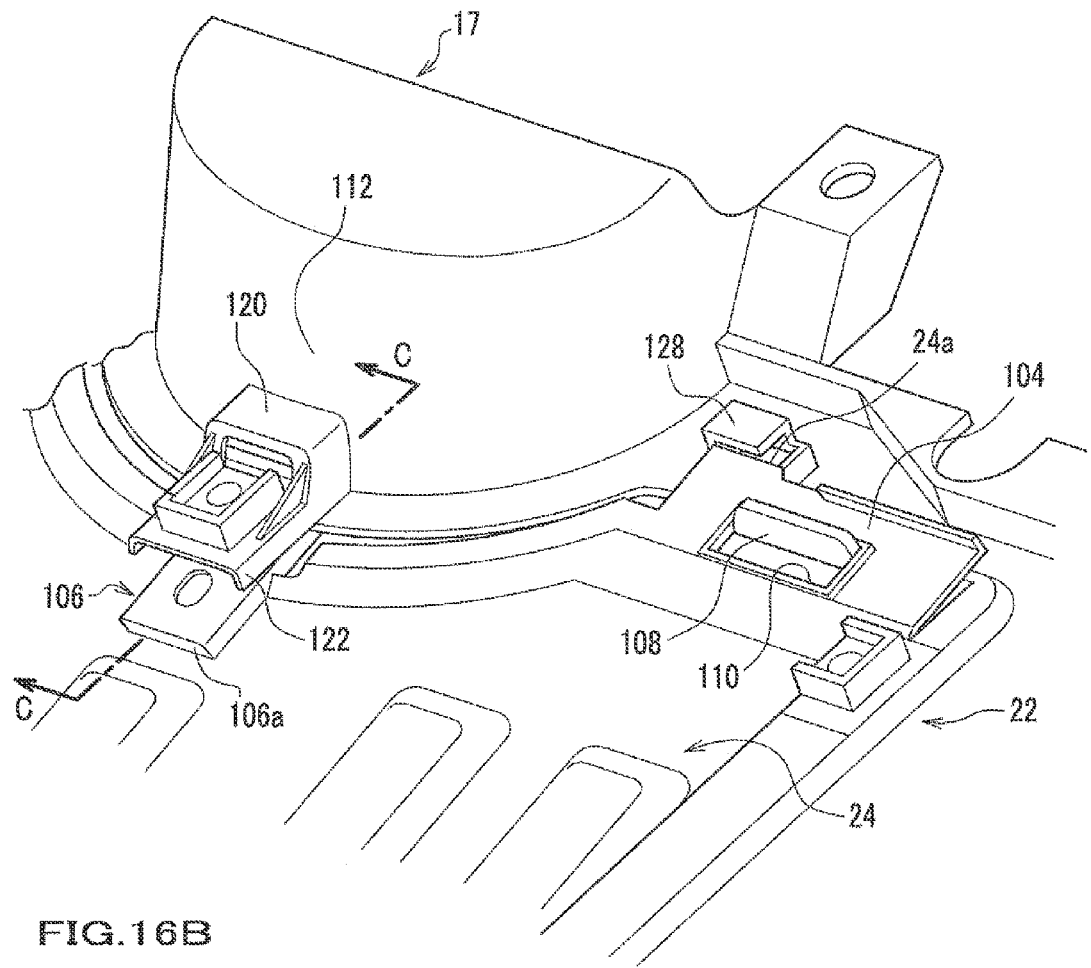
FIG. 16A is a partial enlarged perspective view for explaining a procedure of removing the maintenance cover.
Figure 16B:
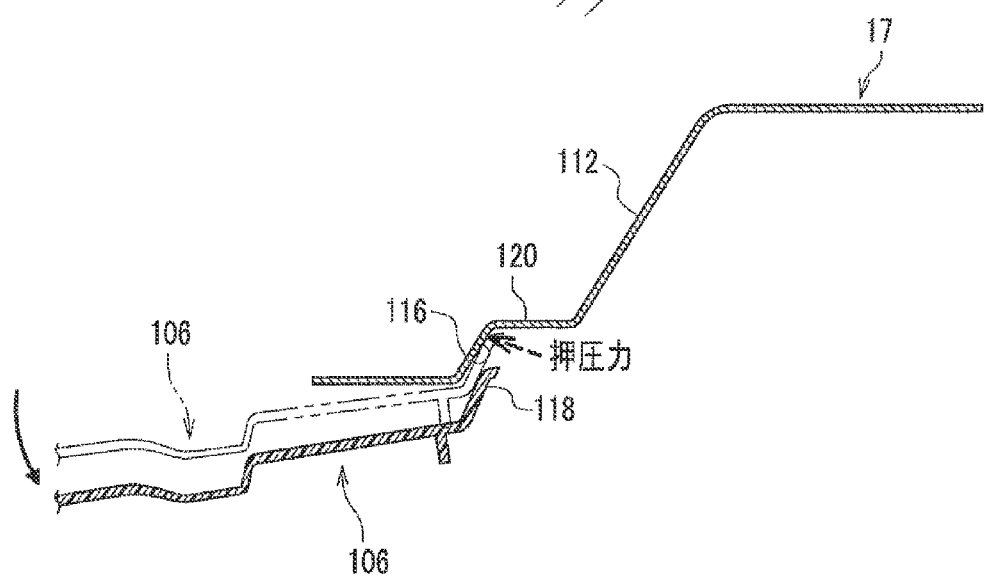
FIG. 16B is a vertical end view taken along the line C-C of FIG. 16A.
Figure 18A:
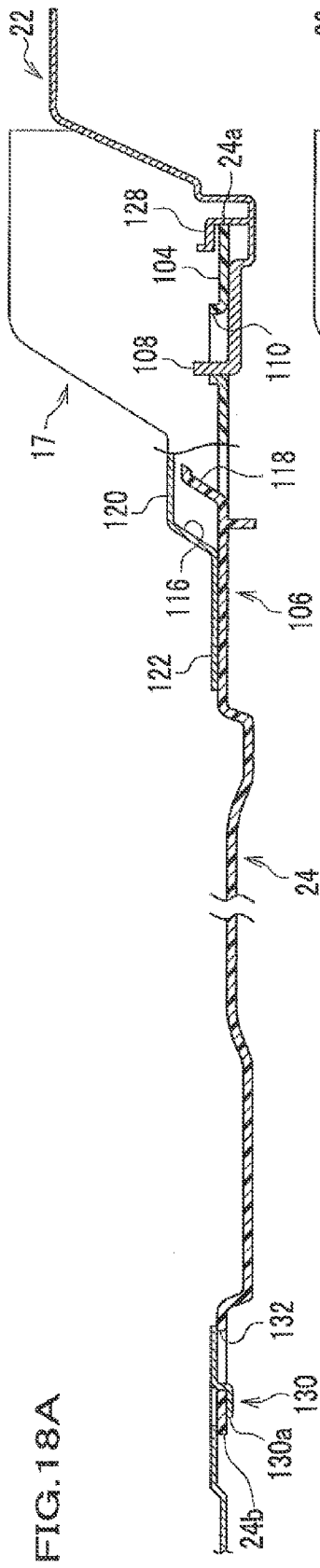
Figure 18B:
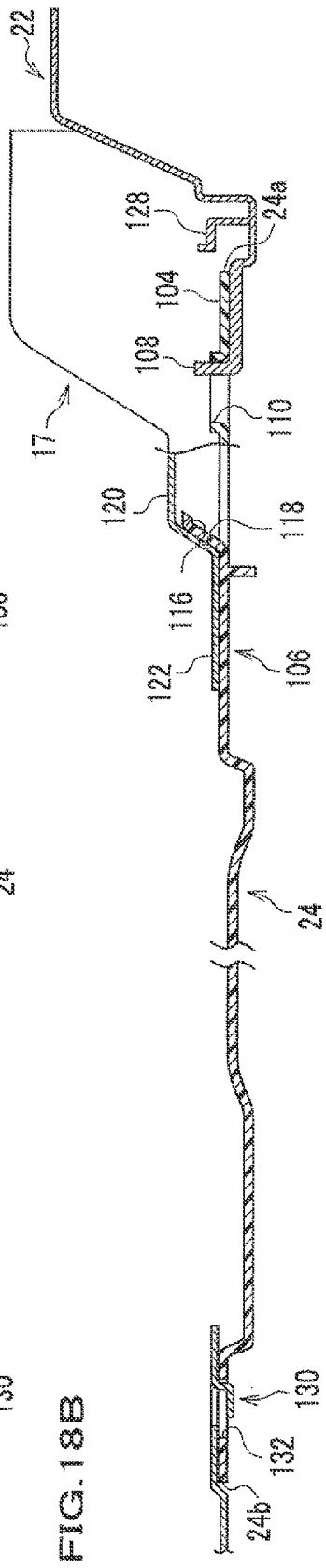
Figure 18C:
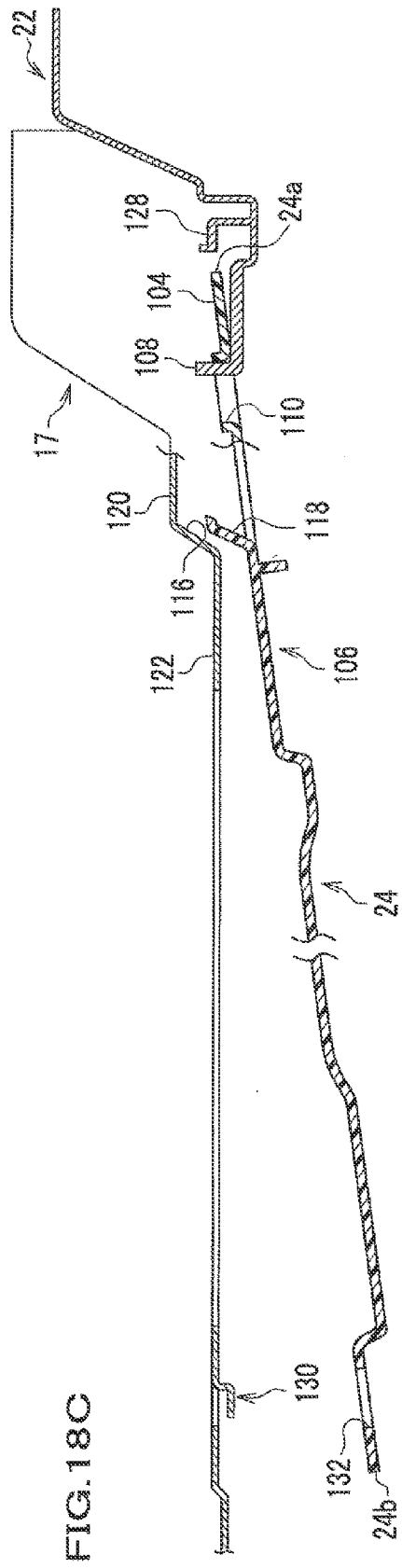

FIG. 11 is an enlarged perspective view of a part of the engine undercover including the maintenance cover as viewed from the top. FIG. 12 is an enlarged perspective view of a part of the engine undercover including the maintenance cover as viewed from the bottom. FIG. 13 is a partial enlarged perspective view illustrating a supporting mechanism of the maintenance cover. FIG. 14A is a partial enlarged perspective view for explaining a procedure of removing the maintenance cover. FIG. 14B is a vertical end view taken along the line A-A of FIG. 14A. FIG. 15A is a partial enlarged perspective view for explaining a procedure of removing the maintenance cover. FIG. 15B is a vertical end view taken along the line B-B of FIG. 15A. FIG. 16A is a partial enlarged perspective view for explaining a procedure of removing the maintenance cover. FIG. 16B is a vertical end view taken along the line C-C of FIG. 16A. FIG. 17A is a partial enlarged perspective view of a rear edge part of the maintenance cover as viewed from the bottom. FIGS. 17B to 17D are operation explanatory diagrams of a rear-edge latch. FIGS. 18A to 18C are vertical cross-sectional views for explaining a procedure of removing the maintenance cover. FIG. 19 is an explanatory diagram illustrating a condition on which a part of the engine undercover is removed during a maintenance.

As shown in FIG. 11, provided on a periphery part of the maintenance cover 24 are a plurality of (in this embodiment, eight) cover bolt fastening parts 100 are provided and the plurality of cover bolt fastening parts 100 fasten the maintenance cover 24 to the cover main body part 22 (the front cover part 22a). Each cover bolt fastening part 100 includes a nut 100b (a clip with a nut) that is inserted in the upper face of the cover main body part 22, and a cover bolt 100a (see FIG. 12) that is fastened to the nut 100b from the bottom of the cover main body part 22. In this case, by loosing the cover bolts 100a and releasing those from the nuts 100b, the maintenance cover 24 becomes in a slidable condition.

The maintenance cover 24 includes a rotation supporting mechanism 102 that supports front edge parts 24a of the maintenance cover 24 in a cantilever manner so as to be rotatable by a predetermined angle when the maintenance cover 24 is slid and removed as will be described later.

The rotation supporting mechanism 102 has a pair of lateral turning support parts 104, 104 which are provided at the right and left of front edge parts 24a of the maintenance cover 24, and a central turning support part 106 which is provided between the pair of lateral turning support parts 104, 104 and backwardly of the lateral turning support parts 104, 104.

Furthermore, the rotation supporting mechanism 102 includes a pair of latch potions 108, 108 having an L-shaped cross-section and provided at respective positions corresponding to the right and left sides of the frond edge parts 24a of the maintenance cover 24 and at the cover-main-body-22 side, a pair of opening parts 110 provided in respective adjacent parts to the lateral turning support parts 104, and catching the respective hook parts 108 with an L-shaped cross-section, and a stopper 118 (see FIG. 14) which is provided at a tip of the central turning support part 106 and can be caught by an internal wall surface (wall surface) 116 of an periphery of an opening part 114 of a side wall part (side wall) 112 of a semi-bowl shaped protrusion part 17.

In other words, the pair of lateral turning support parts 104 are parts which are provided between the respective opening parts 110 formed through the front edge parts 24a of the maintenance cover 24 and the respective front edge parts 24a, and are supported by the hook parts 108 having the L-shaped cross-section in a cantilever manner and provided at the cover-main-body-22 side.

Moreover, the central turning support part 106 is formed by a band-shaped body which protrudes toward the front by a predetermined length from a central part of an arc that curves along the side wall part 112 of the semi-bowl shaped protrusion 17 (see FIG. 16A). The stopper 118 is formed by a tip of the band-shaped body bent upwardly by a predetermined angle. Accordingly, the central turning support part 106 is constructed by a fixed part 106a that is fixed to the maintenance cover 24, a middle part 106b that protrudes toward the front from the arc, and the stopper 118 which extends upwardly from the middle part 106b and which abuts the internal wall surface (wall surface) 116 of the periphery of the opening part 114 of the side wall part (side wall) 112 of the semi-bowl shaped protrusion part 17 (see FIG. 14B).

As shown in FIG. 11, provided at the center of the front edge part 24a of the cover main body part 22 is the semi-bowl shaped protrusion part 17 which is for avoiding an interference with the jack supporting part 15 (see FIG. 2) and which protrudes upwardly. The semi-bowl shaped protrusion part 17 has a top part 17a that is a flat surface, the side wall part 112 having a curved surface that is formed in a curved manner along a circumferential direction, and a box part 120 which protrudes backwardly by a predetermined length from a central part of the side wall part 112 and which has the opening part 114. By providing the opening part 114 of the box part 120, the insertion of the nut (the clip with the nut) 110b of the cover bolt fastening part can be facilitated.

Furthermore, the semi-bowl shaped protrusion part 17 has a covering part 122 which protrudes backwardly from the box part 120 and which covers a top face part of the fixed part 106a of the central turning support part 106, and a frame part 124 that is fixed to a top face of the covering part 122.

Still further, provided at right and left sides of the opening part 114 that is formed in the box part 120 constructing the side wall part 112 are a pair of stopper ribs 126 which is formed in a substantially triangular shape as viewed from a side. In this case, the pair of stopper ribs 126 are provided so as to join the box part 120 around the opening part 114 with the top face of the covering part 122. Accordingly, an engaging strength when the stopper 118 of the central turning support part 106 is engaged with the inner wall surface 116 of the periphery of the opening part 114 of the side wall part 112 can be enhanced.

Provided on the top face of the cover main part 22 are a pair of stoppers 128. As shown in FIG. 14A, when the maintenance cover 24 is slid to the front, the stopper 128 catches the front edge part 24a of the maintenance cover 24 to restrict a sliding operation of the maintenance cover 24. Conversely, as shown in FIG. 15A and FIG. 16A, when the maintenance cover 24 is slid in the backward direction that is the opposite direction to the former direction, a caught condition is released with no overlap as viewed from the top, thereby enabling a rotation operation of the maintenance cover 24.

As shown in FIG. 17, provided on respective rear-edge parts 24b are a pair of rear-edge latches 130 that are formed to protrude backwardly with a substantially L-shaped cross-section. Each of the rear-edge latch 130 is provided so as to pass all the way through respective rectangular shaped opening parts 132 which are formed through the maintenance cover 24 along a direction from the top face of the maintenance cover 24 to the bottom face thereof. The maintenance cover 24 is caught by bend parts 130*a* which are bent substantially in parallel with the bottom face of the maintenance cover 24. The dimension along the back-and-forth direction of the rectangular-shaped opening part 132 is set to be larger than the dimension of the rear-edge latch 130 along the back-and-forth direction. Hence, the rear-edge latch 130 is provided so as to be slidable within the rectangular-shaped opening part 132 (see FIG. 17B to FIG. 17D).

In this case, a condition changes from a condition shown in FIG. 17B in which the maintenance cover 24 is caught by the bend part 130*a* of the rear-edge latch 130 to a condition shown in FIG. 17 C in which the bend part 130*a* is released from the bottom face of the maintenance cover 24. In FIG. 17C, the rear-edge latch 130 becomes free within the rectangular-shaped opening part 132, and a caught condition of the rear-edge latch 130 of the maintenance cover 24 is released. Thus, as will be described later, the maintenance cover 24 becomes rotatable with the lateral turning support parts 104 being as supporting points (see FIG. 17D).

The car body forepart structure 10 according to this embodiment basically employs the above-explained structure. Next, its action and effect will be explained.

First on the basis of FIG. 14 to FIG. 16 and FIG. 18, a work of removing the maintenance cover 24 from the cover main body part 22 will be explained.

As shown in FIG. 14, with the cover bolt fastening parts 100 fastening the maintenance cover 24 to the cover main body part 22, by loosing the cover bolts 100*a* from the bottom side of the cover main body part 22 and disengaging those from the nuts 100*b*, the maintenance cover 24 becomes in a slidable condition.

In this case, as shown in FIG. 18A, with the maintenance cover 24 being fixed to the cover main body part 22, the pair of lateral turning support parts 104 are not engaged with the hook parts 108 with an L-shaped cross-section, respectively, and are in a free condition. Moreover, the central turning support part 106 is distant from the inner wall surface 116 of the peripheral edge of the opening part 114 of the side wall part 112, and is in a free condition. Furthermore, the front edge parts 24*a* of the maintenance cover 24 are in a caught condition by the stoppers 128. Still further, the rear-edge part 24*b* of the maintenance cover 24 is in a caught condition by the rear-edge latches 130 that pass all the way through the respective rectangular-shaped opening parts 132.

Next, as shown in FIG. 15, the maintenance cover 24 is slid backwardly (a direction of an arrow in FIG. 15B) by a predetermined length. As shown in FIG. 18B, with the maintenance cover 24 being slid, the central turning support part 106 abuts the inner wall surface 116 of the peripheral edge of the opening part 114 of the side wall part 112, and the sliding operation is stopped. Moreover, the hook parts 108 with an L-shaped cross-section abut the peripheral edges of the opening parts 110 at the front-edge-part-24*a* side, and the sliding operation is stopped. Furthermore, the front edge parts 24*a* of the maintenance cover 24 are distant from the stoppers 128, and the caught condition is released. Still further, the rear-edge latches 130 which are provided at the cover-main-body-22 sides are released from the bottom face of the rear-edge part 24*b* of the maintenance cover 24, and become in a free condition within the rectangular shaped opening parts 132, so that the caught condition by the rear-edge latches 130 is released.

Next, as shown in FIG. 16, with the lateral turning support parts 104 of the maintenance cover 24 being caught by the hook parts 108 with an L-shaped cross-section of the cover-main-body-22 side in a cantilever manner, the maintenance cover is rotated by a predetermined angle in a counterclockwise direction (a direction of an arrow in FIG. 16B) with the front edge parts 24*a* being as supporting points. In a condition on which the maintenance cover 24 is rotated by a predetermined angle with the lateral turning support parts 104 being as supporting points, the stopper 118 of the central turning support part 106 is distant from the inner wall surface 116 of the peripheral edge of the opening part 114 of the side wall part 112, and the central turning support part 106 becomes in a free condition.

The stopper 118 of the central turning support part 106 maintains a caught condition with the inner wall surface 116 of the peripheral edge of the opening part 114 of the side wall part 112 until the initial stage of the rotation operation of the maintenance cover 24. In the initial stage of the rotation operation of the maintenance cover 24, although force that is given by a worker who attempts to remove the maintenance cover 24 is applied to the maintenance cover 24 in addition to gravitational force of the maintenance cover 24, the bent stopper 118 of the central turning support part 106 pushes the inner wall surface 116 of the peripheral edge of the opening part 114 of the side wall part 112 so as to kick up such an inner wall surface (see FIG. 16B). Hence, load applied to the lateral turning support part 104 can be decreased.

As explained above, according to this embodiment, after the maintenance cover 24 is slid in the backward direction of the vehicle body 12, by rotating the maintenance cover by a predetermined angle with the pair of lateral turning support parts 104 caught at the cover-main-body-22 side being as supporting points, an oil change of the unillustrated engine, etc., can be carried out through the opening part 36.

According to this embodiment, in order to remove the maintenance cover 24 from the cover main body part 22, when the maintenance cover 24 is slid backwardly, the lateral turning support parts 104 and the central turning support part 106 stop the sliding operation of the maintenance cover 24, and the maintenance cover 24 is rotated with the lateral turning support parts 104 being as supporting points. Accordingly, in sliding when heavy load by a worker is applied, the number of supporting points can be increased in comparison with a case in which the maintenance cover 24 is rotated and light load is applied by only gravitational force of the maintenance cover 24, and thus the maintenance cover 24 can be made thin and light-weighted.

Hence, according to this embodiment, in maintenance, after the light-weighted maintenance cover 24 is slid and rotated, the maintenance cover 24 can be hung from the cover main body part 22 by the action of gravitational force. Accordingly, a maintenance work can be carried out without removing the whole maintenance cover 24 from the cover main body part 22. Furthermore, according to this embodiment, a space for retracting the maintenance cover 24 becomes unnecessary unlike the prior art, thereby further improving the maintainability without increasing a work space.

Moreover, according to this embodiment, the rear-edge latches 130 are provided at the cover main body part 22. The rear-edge latches 130 are provided in such a manner that those can be caught within the rectangular shaped opening parts 132 which are formed through the rear-edge part 24*b* of the maintenance cover 24. Accordingly, the front edge part 24*a* of the maintenance cover 24 is provided so as to have the side rotation supporting parts 104 engaged with the respective hook parts 108 with a substantially L-shaped cross-section and mounted on the top face of the cover main body part 22. Additionally, the rear-edge part 24b of the maintenance cover 24 is engaged with the rear-edge latches 130 at the cover-main-body-22 side, and thus, a fastening work of fastening the maintenance cover 24 to the cover main body part 22 can be easily carried out with the maintenance cover 24 being prevented from falling.

Furthermore, according to this embodiment, the front edge part of the engine undercover 18 has the semi-bowl shaped protrusion part 17 that avoids an interference with the jack supporting part 15. The side wall part 112 engaged with the stopper 118 of the central turning support part 106 is provided at the semi-bowl shaped protrusion part 17. Hence, the side wall part 112 has a curved surface which enhances the strength, and the engaging strength for engaging the stopper 118 can be enhanced.

Figure 20:
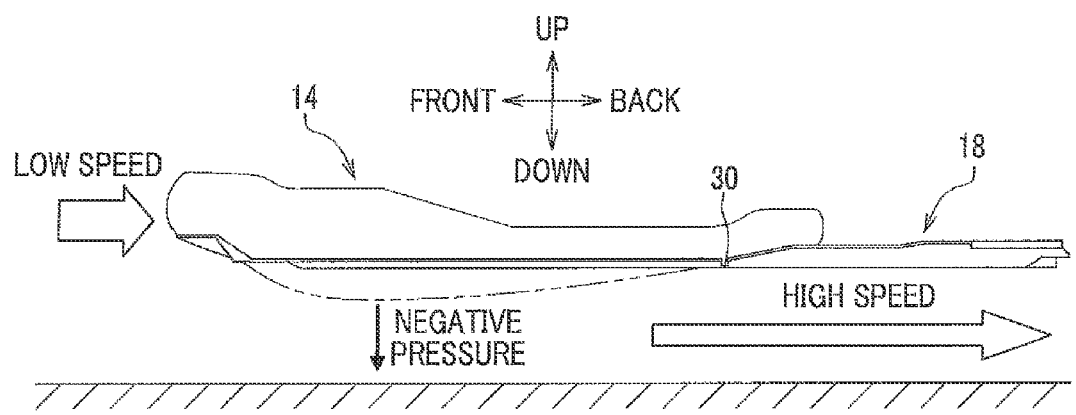
FIG. 20 is an explanatory diagram illustrating a condition on which air goes though the bottom face of the engine undercover.
Figure 21:
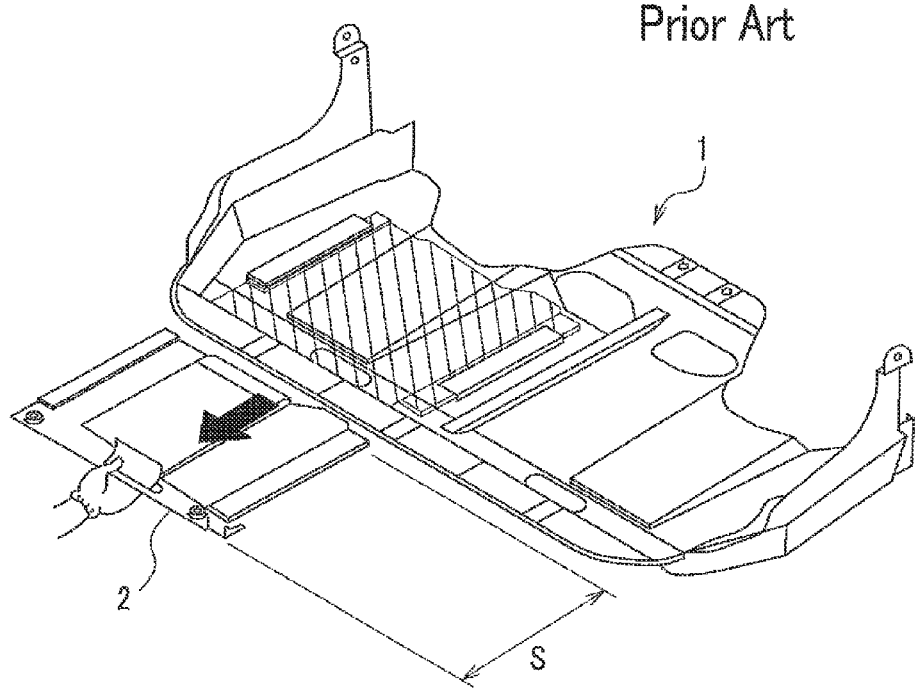
FIG. 21 is an explanatory diagram illustrating a condition on which an inspection cover is slid from an undercover according to a prior art.

FIG. 20 is an explanatory diagram illustrating a condition on which air goes through the bottom face of the engine undercover.

As shown in FIG. 20, in a high speed running condition of the vehicle, air flows through along the bottom face of the engine undercover 18 and along a direction of an arrow, and thus negative pressure is produced at the bottom face side of the engine undercover 18.

According to this embodiment, even if the maintenance cover 24 is provided at the front center of the plastic-made engine undercover 18, the pair of metallic reinforcing members 28, 28 which extend along the back-and-forth direction of the vehicle body are disposed at the right and left side parts adjacent to the maintenance cover 24 along the vehicle width direction. As a result, according to this embodiment, the desired rigidity and strength of the engine undercover 18 are ensured by the pair of metallic reinforcing members 28, 28, and thus a downward deformation of the engine undercover 18 by the negative pressure can be prevented, thereby remarkably contributing to the aerodynamic performance.

Moreover, as shown in FIG. 10, according to this embodiment, the first ribs 44a and the second ribs 44b are provided in a standing manner at the interference region 42 between the metallic reinforcing member 28 fixed to the engine undercover 18 and the metallic sub-frame 14 located above the reinforcing member 28. As a result, according to this embodiment, the plastic-made first ribs 44a and/or second ribs 44b function as obstacles between the metallic reinforcing member 28 and the metallic sub-frame 14, thereby appropriately avoiding a contact (interference) of metallic members with each other.

Furthermore, as shown in FIG. 8, according to this embodiment, the beads 50b1 which are closest to the right and left side edge parts 52 of the engine undercover 18 along the vehicle width direction are formed continuously with the respective first ribs 44a. Accordingly, an interaction of the bead 50b1 which belongs to the interference region 42 and the first ribs 44a further enhances the rigidity and strength of the engine undercover 18.

Still further, as shown in FIG. 8, according to this embodiment, the cut-out part 46 is formed between the first rib 44a and the second rib 44b which are spaced apart from each other by the predetermined interval along the vehicle width direction. The cut-out part 46 can improve, for example, a water drainage performance in the back-and-forth direction of the vehicle body.

Still further, according to this embodiment, by providing the drainage hole 48 adjacent to the cut-out part 46, a drainage to the exterior is facilitated through the drainage hole 48.

Yet further, according to this embodiment, as shown in FIG. 19, the folding line part 30 which has the recess 30a in a substantially rectangular cross-sectional shape and the groove 30b is formed between the front cover part 22a and the rear cover part 22b which construct the engine undercover 18. The front cover part 22a and the rear cover part 22b are provided so as to be independently openable and closable with the folding line part 30 being as a supporting point.

In this case, after the plurality of bolts 20 which fasten the engine undercover 18 to the sub-frame 14 are loosened and removed, as shown in FIG. 19, in a case in which the front cover part 22a is tilted by a predetermined angle with the folding line part 30 being as a supporting point, a maintenance work at the engine side, such as an unillustrated engine and transmission, can be carried out easily and quickly. Conversely, as shown in FIG. 19, in a case that the rear cover part 22b is tilted by a predetermined angle with the folding line part 30 being as a supporting point, a maintenance work of an unillustrated exhaust system component can be carried out easily and quickly.

As explained above, according to this embodiment, it is unnecessary to remove the whole engine undercover 18 from the sub-frame 14, etc., thereby further improving a maintenance performance.

| Description of Reference Numerals | |
|---|---|
| 10 | Car body forepart structure |
| 12 | Vehicle body |
| 14 | Sub-frame |
| 16 | Floor frame |
| 17 | Semi-bowl shaped protrusion part |
| 18 | Engine undercover |
| 22 | Cover main body part |
| 22a | Front cover part |
| 22b | Rear cover part |
| 24 | Maintenance cover |
| 24a | Front edge part |
| 24b | Rear-edge part |
| 28 | Reinforcing member |
| 30 | Folding line part |
| 42 | Interference region |
| 44a, 44b | Rib |
| 46 | Cut-out part |
| 48 | Drainage hole |
| 50a, 50b, 50c, 50d | Beads |
| 52 | Side-edge part |
| 104 | Lateral turning support part |
| 106 | Central turning support part |
| 108 | Hook part |
| 110 | Opening part |
| 112 | Side wall part (side wall) |
| 114 | Opening part |
| 116 | Inner wall surface (wall surface) |
| 118 | Stopper |
| 126 | Stopper rib |
| 130 | Rear-edge latch |
| 132 | Rectangular shaped opening part |

The invention claimed is:

1. A car body forepart structure provided with an engine undercover for covering a bottom face of a vehicle body front part, the engine undercover comprising:
   a maintenance cover provided at a center of the engine undercover;
   the maintenance cover comprising:
      a pair of lateral turning support parts provided at right and left sides of a front edge part of the maintenance cover; and a central turning support part provided between the pair of lateral turning support parts and at a rear side of the pair of lateral turning support parts; wherein the lateral turning support part has an opening part which can catch hook parts with an L-shaped cross-section and is provided at the engine undercover, the central turning support part has a stopper which engages with a wall surface of a side wall provided at the engine undercover, the lateral turning support parts and the central turning support part stop a sliding operation of the maintenance cover when the maintenance cover is slid backwardly, and the maintenance cover is rotated about the pair of lateral turning support parts which serve as supporting points.

2. The car body forepart structure according to claim 1, wherein the engine undercover comprises a rear-edge latch, and the rear-edge latch is engaged with a rectangular shaped opening part formed through the maintenance cover.

3. The car body forepart structure according to claim 1, wherein the engine undercover comprises a semi-bowl shaped protrusion part which is provided at a front edge part thereof so as to avoid an interference with a jack supporting part, and the side wall engaged with the stopper of the central turning support part is provided at the semi-bowl shaped protrusion part.

4. The car body forepart structure according to claim 3, wherein a stopper rib is provided at a periphery part of the opening part of the side wall.

5. The car body forepart structure according to claim 1, wherein the stopper of the central turning support part is engaged with the wall surface of the side wall till an initial stage of the rotation operation of the maintenance cover.

6. The car body forepart structure according to claim 1, wherein the engine undercover comprises:

a front cover part provided between a front part of a sub-frame and a rear part thereof; and a rear cover part provided between the sub-frame and a floor frame, and the front cover part and the rear cover part are provided so as to be independently openable and closable through a folding line part formed at a boundary between the front cover part and the rear cover part.

7. The car body forepart structure according to claim 1, wherein the engine undercover is formed of a plastic material and is fixed respectively to the front part of the sub-frame and the rear part thereof along a back-and-forth direction of the vehicle body, and a metallic reinforcing member is provided so as to extend along the back-and-forth direction of the vehicle body at a side part adjacent to the maintenance cover and along a vehicle width direction.

8. The car body forepart structure according to claim 7, wherein the engine undercover comprises a rib provided in a standing manner at an interference region with the metallic sub-frame disposed above the metallic reinforcing member.

9. The car body forepart structure according to claim 8, wherein the engine undercover comprises a bead that extends along the back-and-forth direction of the vehicle body, and a first rib is provided in a standing manner and continuously with the bead.

10. The car body forepart structure according to claim 9, wherein the engine undercover comprises a second rib formed by lifting up a side-edge part of the engine undercover, and a cut-out part provided between the first rib formed continuously with the bead and the second rib.

11. The car body forepart structure according to claim 9, wherein the engine undercover comprises a drainage hole formed adjacent to the cut-out part.

* * * * *